(12) United States Patent
Reuter

(10) Patent No.: US 8,392,668 B2
(45) Date of Patent: Mar. 5, 2013

(54) DISTRIBUTED-STATE-INFORMATION-BASED DISTRIBUTED COMPUTING SYSTEMS AND METHODS AND PROTOCOLS FOR MANAGING DISTRIBUTED STATE INFORMATION

(75) Inventor: James M. Reuter, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1858 days.

(21) Appl. No.: 11/099,017

(22) Filed: Apr. 4, 2005

(65) Prior Publication Data

US 2006/0221720 A1 Oct. 5, 2006

(51) Int. Cl.
*G06F 12/00* (2006.01)
(52) U.S. Cl. ........................ 711/154; 709/213
(58) Field of Classification Search .................. 711/154; 709/213
See application file for complete search history.

(56) References Cited

U.S. PATENT DOCUMENTS

| | | | |
|---|---|---|---|
| 5,255,369 A | 10/1993 | Dann | |
| 6,330,643 B1 * | 12/2001 | Arimilli et al. | 711/141 |
| 6,347,361 B1 * | 2/2002 | Arimilli et al. | 711/141 |
| 6,738,868 B2 * | 5/2004 | Gharachorloo et al. | 711/141 |
| 6,772,231 B2 | 8/2004 | Reuter et al. | |
| 7,089,293 B2 * | 8/2006 | Grosner et al. | 709/217 |
| 2002/0010840 A1 * | 1/2002 | Barroso et al. | 711/141 |
| 2003/0145179 A1 * | 7/2003 | Gabber et al. | 711/162 |

FOREIGN PATENT DOCUMENTS

EP 0447736 3/1990

OTHER PUBLICATIONS

Satyanarayanan, M. ,Scalable, Secure, and Highly Available Distributed File Access , IEEE Computer, May 1990, vol. 23, No. 5, retreived from internet Aug. 17, 2008 [url: http://www.cs.cmu.edu/afs/cs/project/coda-www/ResearchWebPages/docdir/ieeepcs95.pdf].*
GB Search report dated Jun. 1, 2008.

* cited by examiner

*Primary Examiner* — Jared Rutz

(57) ABSTRACT

Various embodiments of the present invention are directed to distributed data-storage systems that provide non-distributed-data-storage-device-like interfaces to host computers that access the distributed data-storage systems. Distributed data-storage systems generally rely on state information used for execution of commands, received from host computers, by component data-storage systems. Command-executing component data-storage systems may access and modify state information shared among many or all of the component data-storage systems. Embodiment methods of the present invention provide methods for partitioning state information within a distributed data-storage system as well as communications protocols and methods for managing shared state information among the component data-storage systems within a distributed data-storage system. In certain embodiments of the present invention, state information is partitioned into one or more of: (1) local state information that is managed, accessed, and modified separately by each component data storage system; (2) shared state information that is locally cached on component data storage systems for immediate read access, that is periodically refreshed, but that is kept globally consistent among component data storage systems by distributing state-modifying operations; and (3) continuously consistent, shared state information.

15 Claims, 37 Drawing Sheets

```
1:   procedure read()                                    1704
2:       replies ← majority([Read, val-ts])
3:       if the status in all replies is true then return val
4:       else return recover()

1:   procedure write(val)                                1708
2:       ts ← new TS()
3:       replies ← majority([Order, ts])
4:       if any status in a reply is false then return NOK
5:       replies ← majority([Write, val, ts])
6:       if the status in all replies is true then return OK
7:       else return NOK 1:   procedure recover()                                 1706
2:       ts ← new TS()
3:       replies ← majority([Order&Read, ts])
4:       if any status in a reply is false then return NIL
5:       val ← the value with highest val-ts from replies
6:       replies ← majority([Write, val, ts])
7:       if the status in all replies is true then return val
8:       else return NIL
                                                         1702
1:   procedure majority(msg)
2:       Send msg to all, retransmitting periodically
3:       await receive(rep) from [ $\frac{n+1}{2}$ ] processes
4:            such that rep matches msg
5:       return set of received replies
                                                         1710
read Handler()
1:   when receive {Read, ts] from coordinator
2:       status ← (ts = val-ts and ts ≥ ord-ts)
3:       reply [Read-R, status] to coordinator write Handler ()                                         1712
1:   when receive [Write, new-val, ts] from coordinator
2:       status ← (ts > val-ts and ts ≥ ord-ts)
3:   if status then
4:       val ← new-val; store(val)
5:       val-ts ← ts; store(val-ts)
6:   reply [Write-R, status] to coordinator order & read Handler ()                                  1714
1:   when receive [Order&Read, ts] from coordinator
2:       status ← (ts > max(val-ts, ord-ts))
3:   if status then ord-ts ← ts; store(ord-ts)
4:   reply [Order&Read-R, val-ts, val, status]

order Handler()                                          1716
1:   when receive [Order, ts] from coordinator
2:       status ← (ts > max(val-ts, ord-ts))
3:   if status then ord-ts ← ts; store(ord-ts)
4:   reply [Order-R, status] to coordinator
```

*Figure 17*

```
1    procedure CacheRefresh( lease_time )
2            temp_lease_timeout ← current_time + lease_time
3            status ← read()
4            if status is OK
5                    lease_timeout ← temp_lease_timeout +
6                    wait lease_time – message delay and skew
allowance
```
— 2902

```
1    procedure CoherentCacheRead (cmd)
2            if Inquiry command, process it and return response
3            if current_time < delay_timeout
4                    wait until delay_timeout
5            if current_time > lease_timeout
6                    return NOT READY status
7            check cmd against state, return failure or proceed
with command
```
— 2904

```
1    procedure StateUpdate(s)
2            ts ← new TS()
3            replies ← majority([Order,ts])
4            if any status in a reply is false (or no majority), then
return NOK
5            (this fails or retries state change command)
6            replies ← totality([StateWrite, s, ts])
7            if any status in a reply is false (or no majority), then
return NOK
8            if totality of true replies is achieved
9                    any([CancelDelay,ts])
```
— 2906

```
1    procedure access (ts)
2            status ← majority[Order&Read, ts]
3            return status and val from the highest val_ts entry
found
```
— 2908

```
1    procedure modify(new_value, ts)
2            replies ← totality ([StateWrite, new_value, ts])
3            if any status returned false or majority did not reply
then return NOK
4            if totality of true replies is received
5                    any ([CancelDelay, ts])
6            return OK
```
— 2910

```
1    procedure AtomicStateUpdate ()
2            ts ← generate new timestamp
3            <status,val> ← access (ts)
4            if status is false then return NOK
5            compute new_state based on old_state in val
6            status ← modify (new_state, ts)
7            if status is true return OK
8            else return NOK
```
— 2912

*Figure 29*

State Write Handler ()
1    when receive [StateWrite,new_s,ts]    3002
2        status ← ts > val-ts and ts > = ord-ts
3        if status then
4            delay_timeout ← current_time + lease_time + skew allowance
5            s ← new_s
6            val-ts ← ts
7            process state change side effects
8        reply [Write-R, status]

Cancel Delay Handler ()    3004
1    when receive [CancelDelay,ts]
2        status ← ts > = val-ts > = ord-ts
3        if status then
4            delay_timeout ← NIL (cancel delay)
5            side effect is to terminate any active delays in ScsiCommandCheck

*Figure 30*

DISTRIBUTED-STATE-INFORMATION-BASED DISTRIBUTED COMPUTING SYSTEMS AND METHODS AND PROTOCOLS FOR MANAGING DISTRIBUTED STATE INFORMATION

TECHNICAL FIELD

The present invention is related to distributed computing systems and, in particular, to distributed data-storage systems and other distributed computer systems that employ distributed state information and methods for efficiently managing the distributed state information.

BACKGROUND OF THE INVENTION

Data-storage systems have steadily evolved, over the past 50 years, from low-capacity and relatively slow devices directly interconnected with host computers to complex, extremely fast, and extremely high-capacity and high-bandwidth stand-alone data-storage systems that can be concurrently accessed over high-bandwidth communication systems by many different remote host computers. FIG. 1 illustrates one type of distributed computing environment in which stand-alone data-storage systems provide data storage and data retrieval to remote host computers. In FIG. 1, two host computers 102-103 access three different data-storage systems 106-108 via a high-bandwidth communications network 110. Each data-storage system, such as data-storage system 106, includes a processing component 112 that interfaces to the high-bandwidth communications network 110 and that also interfaces to an internal communications medium, such as a high-speed bus 114 that links the processing component 112 with individual storage devices 116-119. The processing component 112 of a data-storage system provides a data-storage interface to remote, host computers 102-103 comprising commands that the remote host computers can send to data-storage systems for execution. These commands allow host computers to read data stored within data-storage systems, to write data to data-storage systems, to inquire about the capacities and configurations of data-storage systems, and to configure data-storage systems. Similarly, individual storage devices 116-119 provide a data-storage interface to allow the processing component 112 of a data-storage system to read data from, to write data to, to inquire about the contents and configuration of, and to configure individual storage devices.

In many, currently available distributed computing systems, the small computer systems interface ("SCSI") is employed both as a data-storage interface provided to remote host computers by data-storage systems, as well as the data-storage interface provided by individual storage devices to the processing component of a data-storage system. In certain of these systems, SCSI commands are embedded in a higher-level network protocol, such as the fibre channel, for exchange of commands and responses between host computers and data-storage systems over a high-bandwidth network. SCSI commands and responses are exchanged between the processing component of a data-storage device and individual data-storage devices via internal buses, such as SCSI bus 114, that interconnect the individual storage devices with the processing component. In general, although multiple remote host computers may concurrently access a particular data-storage system, such as data-storage system 106 in FIG. 1, commands from multiple, remote sources are funneled through a single processing component, such as processing component 112, which greatly simplifies handling of the many different concurrent-access issues that may arise.

Complex, multi-processor, stand-alone data-storage systems, such as high-end disk arrays, have more recently become commercially available. FIG. 2 is a block diagram of an exemplary complex, multi-processor data-storage system. The data-storage system 202 includes two different network controllers 204-205 interconnected with two different high-bandwidth network media 206-207, two different processors 208-209, both interconnected with both network controllers 204 and 205, and two different memories 210 and 211, at least one of which, 211, is shared by both processors 208 and 209. Both processors 208 and 209 are interconnected through multiple internal busses to a number of internal data-storage systems 214-219, each equivalent to the standalone data-storage systems discussed above with reference to FIG. 1. The complex, multi-processor data-storage system shown in FIG. 2 may be concurrently accessed over multiple high-bandwidth communications media by numerous remote host computers. In this complex data-storage system, there are a far greater number of concurrency and data distribution problems than in the simpler data-storage systems discussed above with reference to FIG. 1. For example, unlike in the simpler data-storage systems, the more complex data-storage system shown in FIG. 2 may coordinate concurrent and simultaneous processing of commands by the two different processors. However, techniques developed for parallel processing computer systems can be used to coordinate activities of multiple processors, and to share and coordinate access to common state information employed by the multiple processors to execute commands received from remote host computers. For example, shared state information and shared command queues may be stored in the shared memory 211, with access by the multiple processors to the shared state information and shared command queues coordinated by hardware semaphores and various semaphore-based access-control techniques, locking techniques, and other techniques developed to handle problems arising from contention for shared resources by multiple processing entities. Thus, even in the complex, multi-processor data-storage device of FIG. 2, a commonly shared memory or other shared components may serve as a kind of funnel through which concurrent and simultaneous execution of commands can be funneled, providing a means for simplifying issues arising from contention for, and sharing of, state information and for synchronizing simultaneous task execution.

As the needs for ever greater storage capacities, higher bandwidths, and increased fault tolerance continue to grow, driven by ever increasing processor and networking capabilities and by expanding capabilities of, and demands on, computer applications, new strategies for designing, constructing, and managing complex, distributed, highly parallel data-storage systems have emerged. A particularly attractive strategy and design for high-end data storage systems involves distributing a data-storage system over many separate, intercommunicating data-storage systems, or nodes. FIG. 3 illustrates one example of a distributed data-storage system. In FIG. 3, three different data-storage systems 302-304, such as the data-storage systems discussed above with reference to FIG. 2, are interconnected with one another by one or more interconnections to two different high-bandwidth interconnection media 306 and 308. Additional data-storage systems 310-313 are interconnected with two of the previously mentioned data-storage systems 302 and 304 via three additional interconnection media 314-316. Data-storage systems 310 and 311 are interconnected with each other, and with data-storage system 302, through a single interconnection medium 314, while data-storage system 302 is directly interconnected with data-storage systems 310-313 through multiple interconnection media 314 and 315, and is interconnected with data-storage systems 303 and 304 through one or both of the high-bandwidth interconnection media 306 and 308. All seven data-storage systems 302-304 and 310-313 together form a single distributed data-storage system 318 that provides a network-addressable, uniform, cohesive, and well-behaved command-based data-storage interface to a number of remote host computers that intercommunicate with the distributed data-storage system 318 via one or both of the high-end intercommunication networks 306 and 308.

In many cases, the data-storage interface provided by a distributed data-storage system, such as distributed data-storage system 318 in FIG. 3, needs to appear and behave identically to a data-storage interface provided by conventional, non-distributed data-storage systems such as those described with reference to FIGS. 1 and 2, to avoid changes to applications and operating systems of remote host computers that access the distributed data-storage system. In the case of a distributed data-storage system, many profound issues with respect to concurrent and simultaneous processing of commands by the separate, component data-storage systems that together compose the distributed data-storage system are generally encountered. For example, state information that describes the current state of the distributed data-storage system may be accessed by all or a large fraction of the component data-storage systems. However, the state information may also be updated during command processing, with each update generally carried out by one of the component data-storage systems.

If only a single, central copy of the state information is maintained within the distributed data-storage system, then all but one of the component data-storage systems employ network communications in order to access the state information. Because some portion of state information may be accessed for all or a large subset of the different types of commands executed by data-storage systems, a single, central copy of the state information may lead to extremely high communications overheads and to unacceptable latency in command execution, as well as to serious single-point failures that can defeat high-availability operation of the distributed data-storage system. If, by contrast, the state information is replicated and distributed among the component data-storage systems, then great care needs to be taken to update all of the replicated copies of the state information when any single copy in the state information is updated by local processing of a command on one of the component data-storage systems. Update propagation is non-trivial, and may lead to high communications overheads and large command-processing latencies. Many other problems abound in complex, distributed computing systems, such as distributed data-storage systems. For this reason, designers, manufacturers, retailers, and users of distributed data-storage systems, and other distributed computing systems, have recognized the need for distributed computing systems and distributed computing systems designs that address distributed state information problems without introducing unacceptable overheads and performance degradation.

SUMMARY OF THE INVENTION

Various embodiments of the present invention are directed to distributed data-storage systems that provide non-distributed-data-storage-device-like interfaces to host computers that access the distributed data-storage systems. Distributed data-storage systems generally rely on state information used for execution of commands, received from host computers, by component data-storage systems. Command-executing component data-storage systems may access and modify state information shared among many or all of the component data-storage systems. Embodiment methods of the present invention provide methods for partitioning state information within a distributed data-storage system as well as communications protocols and methods for managing shared state information among the component data-storage systems within a distributed data-storage system. In certain embodiments of the present invention, state information is partitioned into one or more of: (1) local state information that is managed, accessed, and modified separately by each component data storage system; (2) shared state information that is locally cached on component data storage systems for immediate read access, that is periodically refreshed, but that is kept globally consistent among component data storage systems by distributing state-modifying operations; and (3) continuously consistent, shared state information.

BRIEF DESCRIPTION OF THE DRAWINGS

FIG. 17 shows pseudocode implementations for the routine handlers and operational routines shown diagrammatically in FIG. 18 and used in various embodiments of the present invention.

FIG. 29 shows pseudocode implementations of the procedures that may be added to the distributed-storage-register procedures and handlers in order to implement a distributed, but locally cached, storage register used in various embodiments of the present invention.

FIG. 30 shows pseudocode implementations of the handlers that may be added to the distributed-storage-register procedures and handlers in order to implement a distributed, but locally cached, storage register used in various embodiments of the present invention.

DETAILED DESCRIPTION OF THE INVENTION

Embodiments of the present invention are directed to various types of distributed systems, including distributed data-storage systems, which present command-based interfaces to various remote computing entities, such as host computers. A challenge in designing and implementing such distributed systems is to provide distributed maintenance, access, and modification of state information used by component devices and systems within the distributed systems that execute commands received from host computers and other computing entities. Embodiments of the present invention include methods for managing, accessing, and modifying state information for distributed systems, as well as distributed systems that employ these methods to provide maintenance, access, and modification of distributed-system state information.

Figure 1:
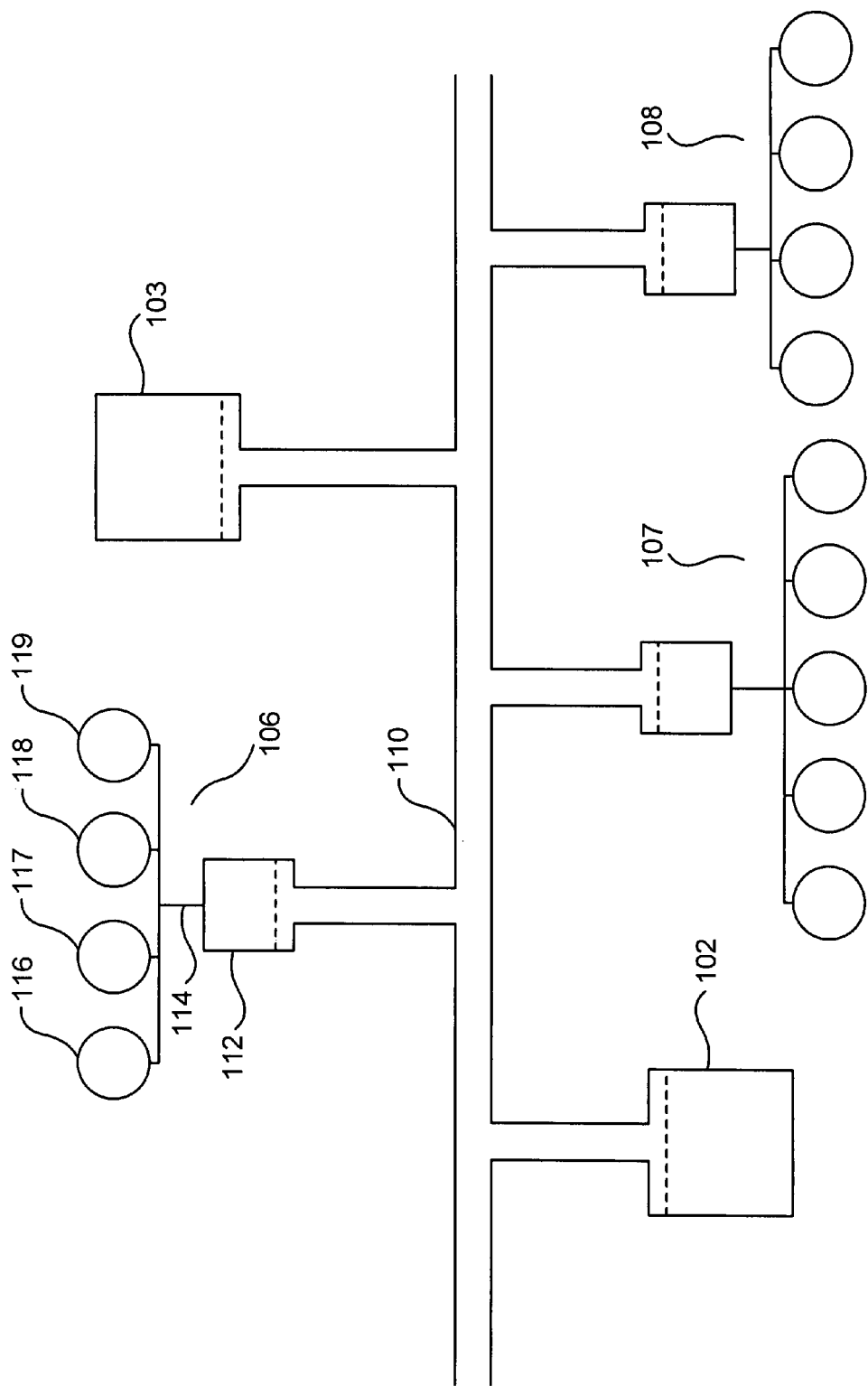
FIG. 1 illustrates one type of distributed computing environment in which stand-alone data-storage systems provide data storage and data retrieval to remote host computers.
Figure 2:
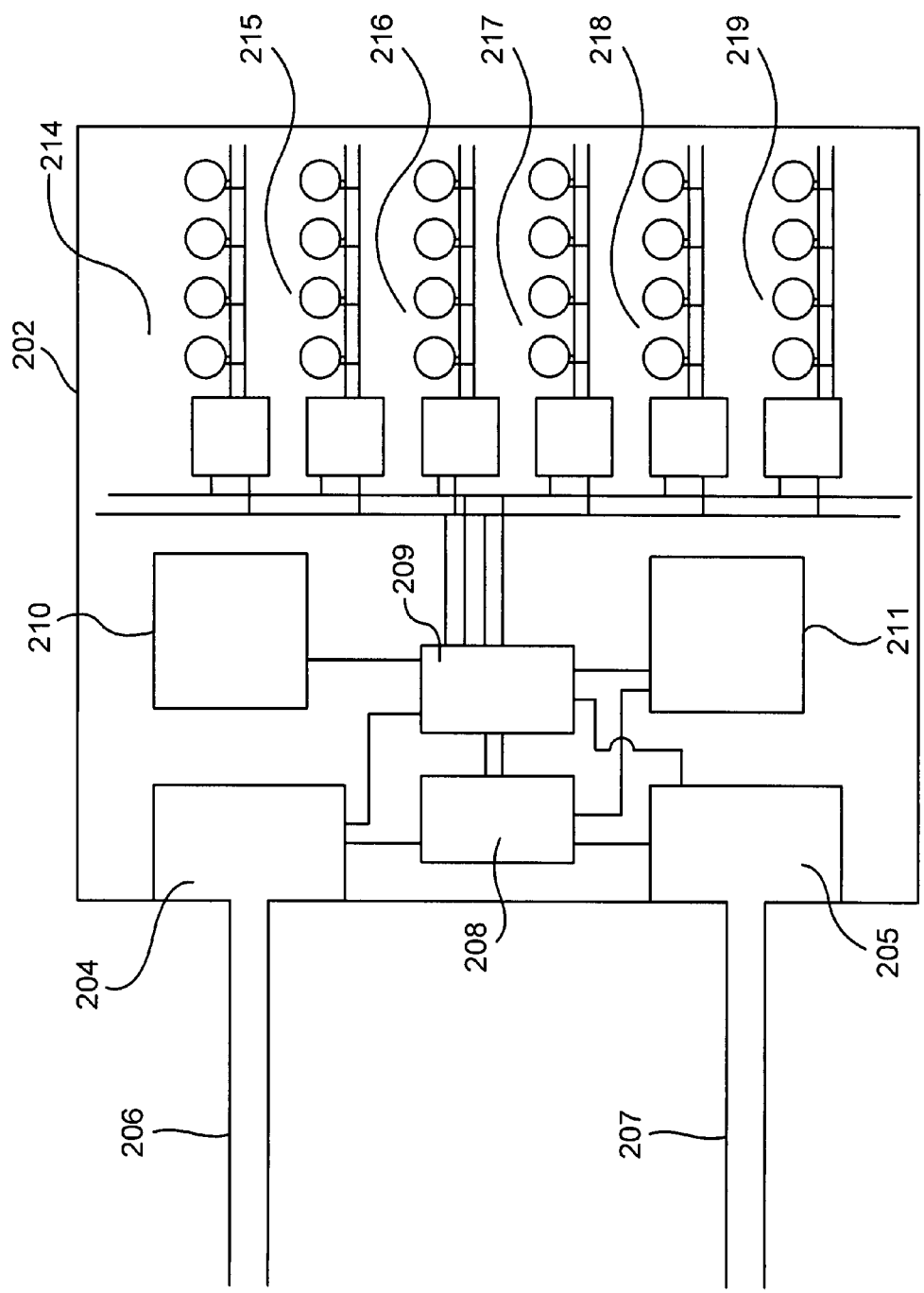
FIG. 2 is a block diagram of an exemplary complex, multi-processor data-storage system.
Figure 3:
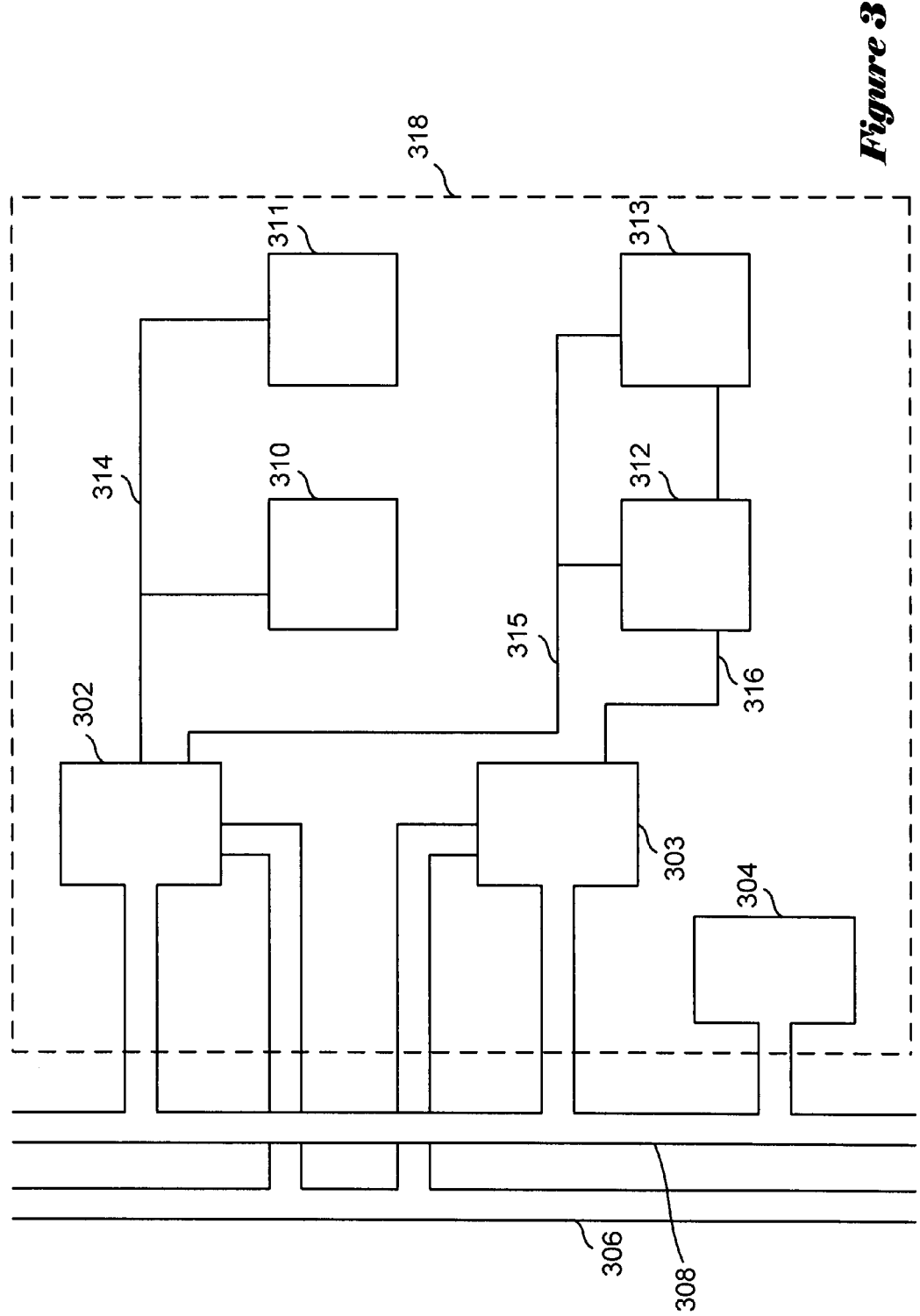
FIG. 3 illustrates one example of a distributed data-storage system.
Figure 4A:
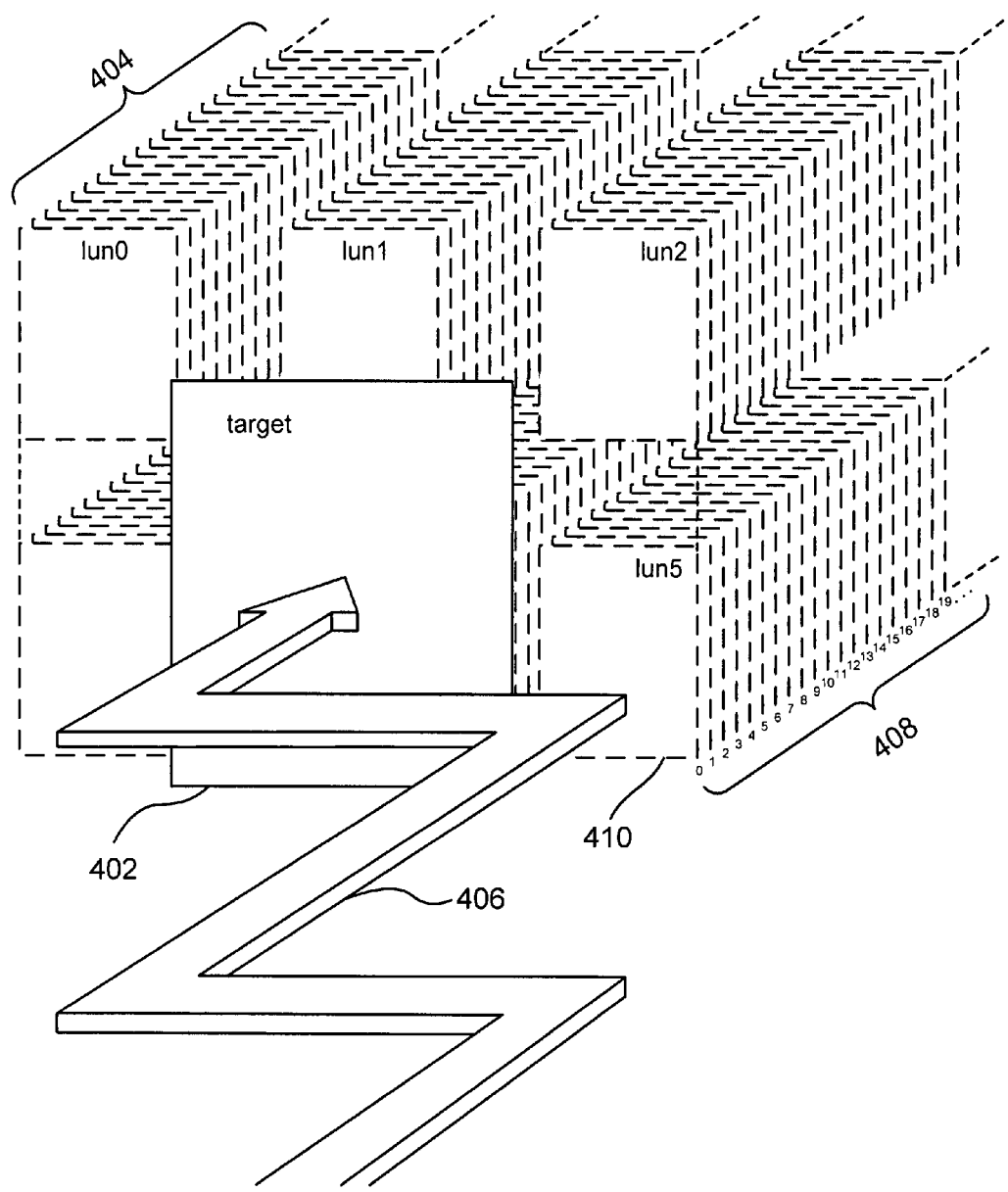
FIGS. 4A-C illustrate general characteristics of conventional data-storage interfaces that are desirably incorporated into data-storage interfaces provided by distributed data-storage systems.
Figure 4B:
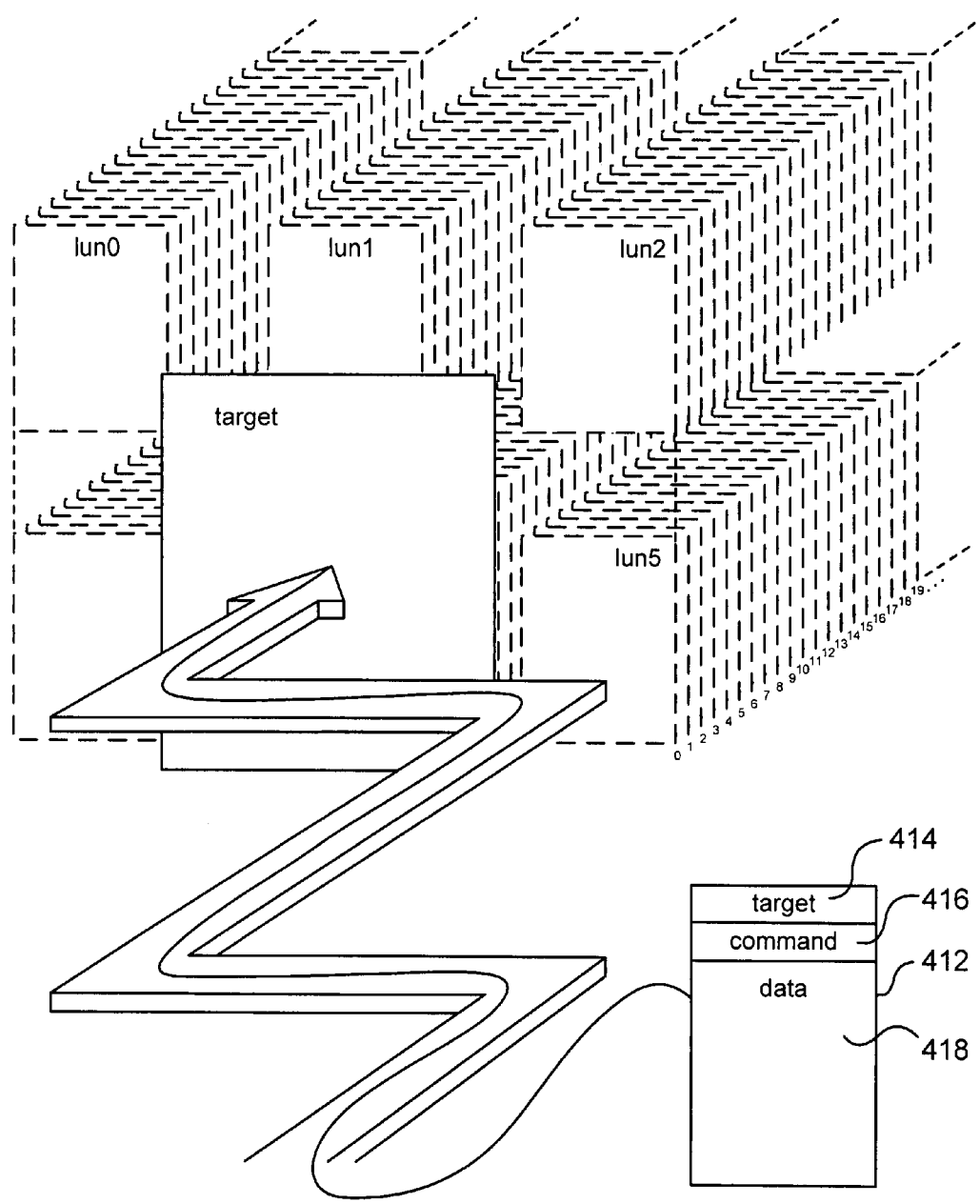
Figure 4C:
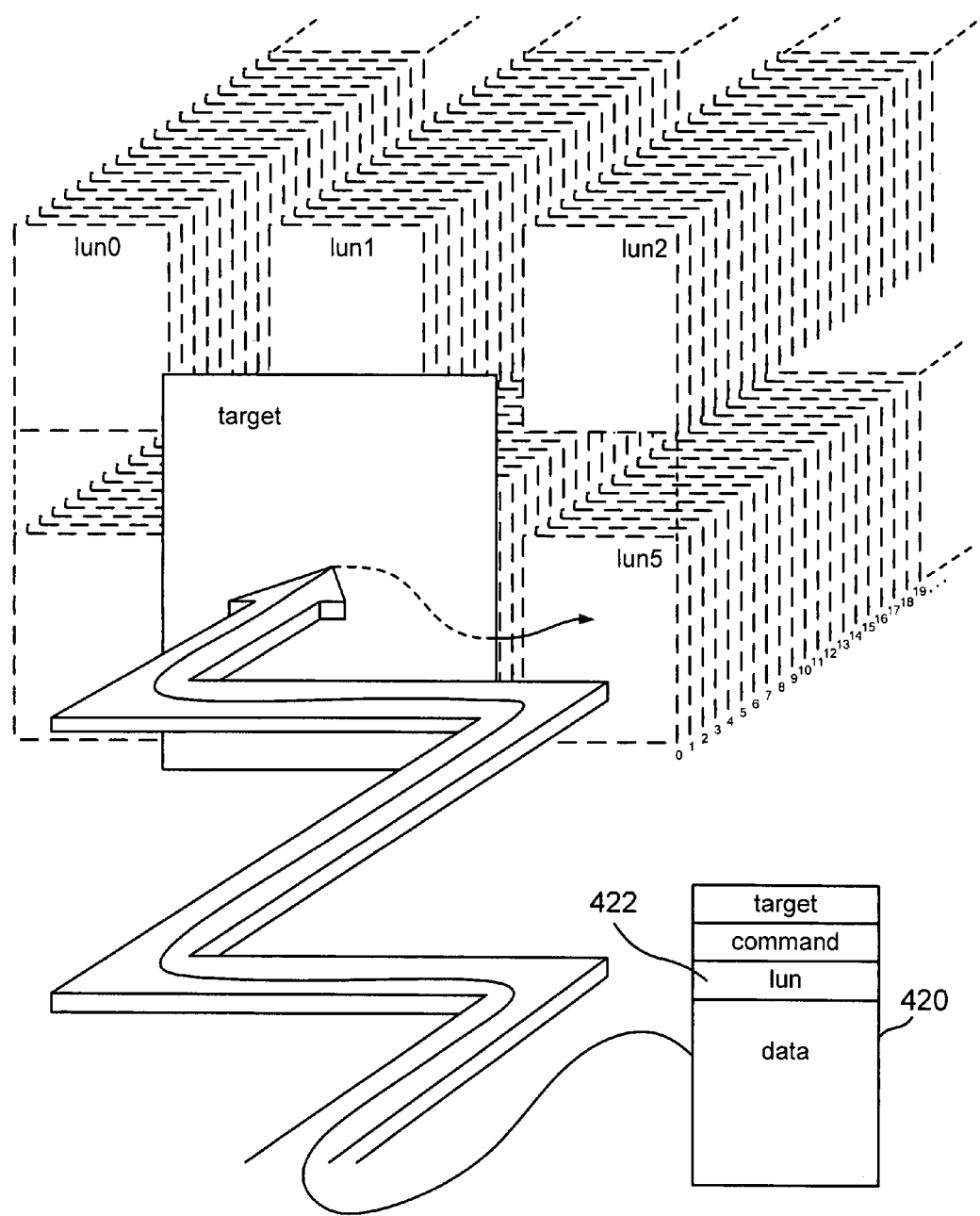

FIGS. 4A-C illustrate general characteristics of conventional data-storage interfaces that are desirably incorporated into data-storage interfaces provided by distributed data-storage systems. As shown in FIG. 4A, many data-storage devices and systems, such as data-storage devices that provide a SCSI interface, are abstractly viewed through the interface as an addressable target 402 associated with one or more logical units, such as logical unit zero 404 illustrated in FIG. 4A. The target 402 is associated with one or more communications-media addresses, allowing a remote host computer to send commands to, and receive responses from, the data-storage device via one or more communications media, such as communications medium 406 in FIG. 4A. For example, a disk-array data-storage device may have one or more fiber-channel addresses to which a remote computer can send SCSI commands embedded within fiber-channel frames and from which the remote computer can receive responses, also embedded within fiber-channel frames. Data stored within a data-storage device is generally stored in one or more sequentially addressed blocks of one or more logical units. Each logical unit is associated with a logical unit number ("LUN") or another type of address or reference by which the logical unit can be identified. A logical unit, such as logical unit 408 in FIG. 4A, can be viewed through the data-storage interface as a sequence of data blocks, each data block in FIG. 4A represented as a rectangle delineated by dashed lines, such as data block 410. Data blocks are generally further divided into computer words and/or bytes of fixed bit lengths.

While the target/logical-unit abstraction provided by common data-storage interfaces is generally straightforward and logically organized, the actual physical implementation may be quite complex. Logical units may span multiple physical data-storage devices, or may span only small portions of a single data-storage device. The physical ordering of data blocks, and computer words or bytes within data blocks, on physical data-storage-device media may not be sequential, but is organized in complex ways to take advantage of various types of efficiencies related to physical device configuration and design. For example, in multiple-platter magnetic disk drives, data blocks of a single logical unit may be scattered across multiple platters and across multiple tracks within each of the multiple platters, to minimize latencies associated with head movements and platter rotation.

The commands provided by a data-storage interface can be, to some extent, logically partitioned into two sets. The first set of commands, illustrated in FIG. 4B, can be thought of as addressed to a data-storage device in general, and executable at the target level within the data-storage device. An exemplary partial format for a command from this first set of commands 402 is shown in the lower right-hand corner of FIG. 4B. This type of command minimally needs a target address field 404 which directs the command to a particular target device, and a command identifier field 406 which contains a numerical identifier for the command. The command will optionally, but generally, contain one or more additional data fields 408. A command of this first set of commands may be completely executed within the processing component of a data-storage device, with reference to state information stored in memory, on a component storage device, or both within memory and on a component storage device. Examples of commands in this first set of commands include commands that solicit global information about a data-storage system, solicit information about current configuration parameters, that modify current configuration parameters, and that direct various global operations, such as a data-storage-system reset. A data-storage interface may specify that certain of these commands be executable, regardless of whether or not the data-storage device is ready to execute data-retrieval or data-storage commands.

The second set of commands is illustrated in FIG. 4C. An exemplary format 420 for commands of the second set is shown in the lower, right-hand corner of FIG. 4C. In addition to the fields described for the command format shown in FIG. 4B, commands of the second set generally include a LUN field 422, or an equivalent field, that specifies the logical unit of the data-storage system to which the command is directed. Example commands from the second set of commands include READ and WRITE commands for accessing and storing data. As shown in FIG. 4C, commands of this second set of commands are generally executed by the processing component of the data-storage system, relying on state information, as well as by one or more component data-storage devices on which the logical unit to which the command is addressed physically resides. In modern data-storage systems, processing of a command of the second type of commands may often be carried out by the processing component of the data-storage system, with reference to logical-unit data cached in memory, without physical access of the logical-unit data on the one or more physical data-storage devices that contain a logical unit. Nonetheless, commands of the second set of commands are executed by using both global state information as well as logical-unit-specific specific information. Any particular command set of any particular data-storage-device interface may include additional types of commands, or commands not easily classified according to the scheme discussed above with reference to FIGS. 4A-C, but the simple command-classification scheme is useful and applicable, in general, for designing distributed systems and communications protocols for distributed systems.

Figure 5:
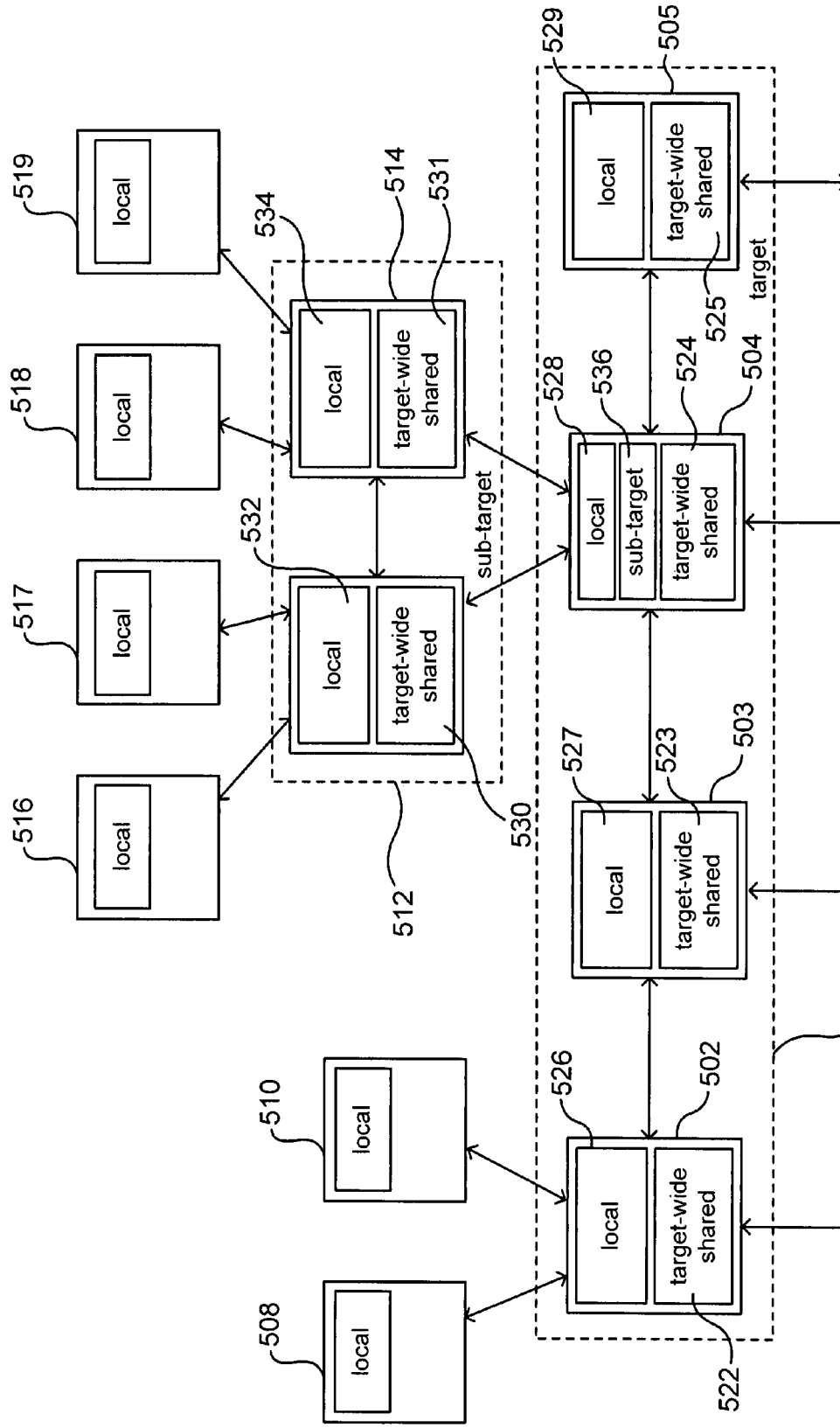
FIG. 5 illustrates one possible organization of component data-storage systems within a distributed data-storage system.

FIG. 5 illustrates one possible organization of component data-storage systems within a distributed data-storage system. As discussed below, this organization is not intended to reflect typical organizations based on the SCSI protocol, or on any other particular data-storage protocol or interface. In this organization, commands can be directed to the distributed data-storage system through any of four component data-storage systems 502-505 that together compose the distributed target portion 506 of the distributed data-storage system. Each of the target component data-storage systems 502-505 may locally support one or more logical units provided by the distributed data-storage system through a data-storage interface. Component data-storage system 502 is additionally directly interconnected with two component data-storage systems 508 and 510, each of which implements one or more different logical units. Component data-storage system 504 is directly interconnected with two component data-storage systems 512 and 514 that together implement a sub-target that interfaces to four additional data-storage systems 516-519 that each implements one or more logical units. In the organization shown in FIG. 5, each logical unit provided by the distributed data-storage system is fully contained within a single component data-storage system. In this distributed data-storage system, it would be reasonable to expect that each of the component data-storage systems 502-505 that together compose the target component 506 of the distributed data-storage system shares target-wide, shared state information 522-525 to allow each of the target component data-storage systems to receive and execute commands addressed to the distributed data-storage system. In addition, each of the target component data-storage systems 502-505 may also maintain separate, discrete local state information 526-529 concerning the particular logical units implemented locally by the component data-storage systems as well as other local state information. Similarly, the component data-storage systems 512 and 514 that together compose a sub-target within the distributed data-storage system may each maintain shared sub-target state information 530 and 531 as well as local state information 532 and 534 particular to each of the component data-storage devices. On the other hand, component data-storage systems 508, 510, and 516-519 may use only local state information, since these component data-storage systems do not receive commands directly from remote host computers, but only internal requests sent from distributed target or sub-target component systems for data stored in logical units locally implemented by the component data-storage systems. Component data-storage system 504 may additionally use sub-target state information 536, a portion of which may be shared with component data-storage systems 512 and 514. Thus, in a given distributed data-storage system, such as the distributed data-storage system diagrammed in FIG. 5, each component data-storage system may maintain certain local state information particular to that component data-storage system, as well as one or more types of shared state information used by various subsets of the component data-storage devices.

In one, simpler, proposed distributed data-storage system, each component data-storage system is an equivalent peer with respect to all other component data-storage systems, and thus each component data-storage system may maintain both local state as well as globally shared state information. It should be noted that the organization described with reference to FIG. 5 is hypothetical, and not intended to reflect an organization that might be typically adopted when any of the many, particular data-storage protocols are employed. For example, in typical distributed systems based on SCSI, the bulk of modifiable state information, both local and shared, is contained at the logical-unit level, with little state information contained at the target and sub-target level.

Figure 6A:
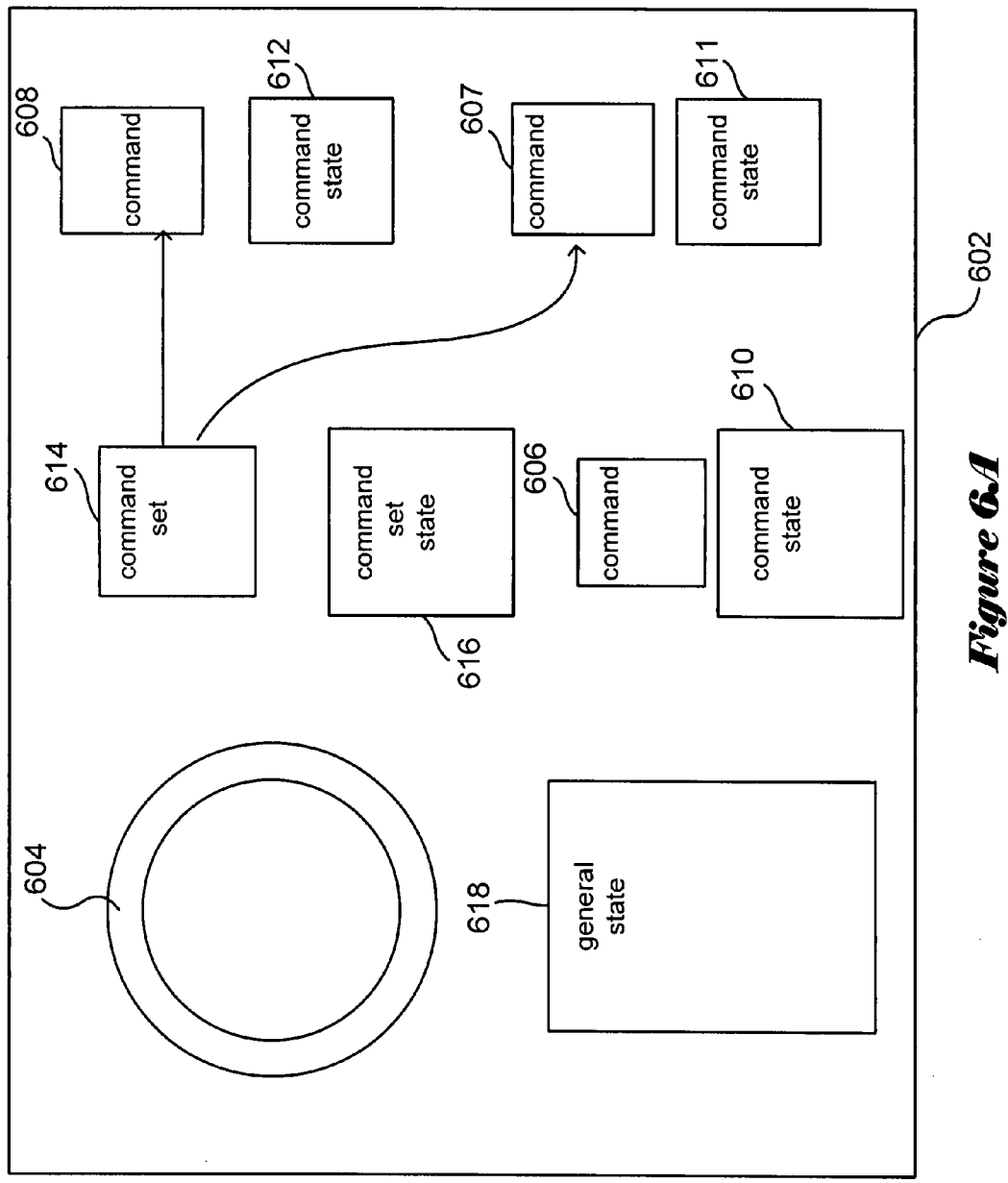
FIGS. 6A-D illustrate differences in frequencies of access of shared state information that can be used as one basis for partitioning shared information within a distributed computing system in various embodiments of the present invention.

Another way to partition state information within a distributed data-storage system, or other distributed computing system, is by frequency of access and/or modification. This type of partitioning is relevant to any shared or globally shared state information maintained within the distributed computing system. FIGS. 6A-D illustrate differences in frequencies of access of shared state information that can be used as one basis for partitioning shared information within a distributed computing system. In FIG. 6A, abstractly represented components of a component data-storage system within a distributed data-storage system are shown. The component data-storage system 602 includes a command queue 604 onto which received commands are queued and from which commands are de-queued and executed. The component data-storage system additionally includes logic components 606-608, each devoted to processing one type of command, and each associated with state information 610-612 particular to execution of the command. The component data-storage system further includes a logic component 614 devoted to front-end processing of either of the two types of commands executed by command logic components 607 and 608, as well as state information 616 associated with that logic component 614. Finally, the component data-storage system includes general state information 618 that may be referenced for execution of all, or almost all, different types of commands. In general, state information is stored in random access memory, non-volatile mass-storage, or a combination of random access memory and mass storage. Logic components are generally software routines executed by a processing component, but may also be fully or partially implemented in firmware or logic circuits. A command queue is generally stored within random access memory and maintained and accessed by a processing component under software program control. However, the detailed logical and physical components of a component data-storage system are not relevant to the frequency-of-access partitioning of state information currently discussed with reference to FIGS. 6A-C.

Figure 6B:
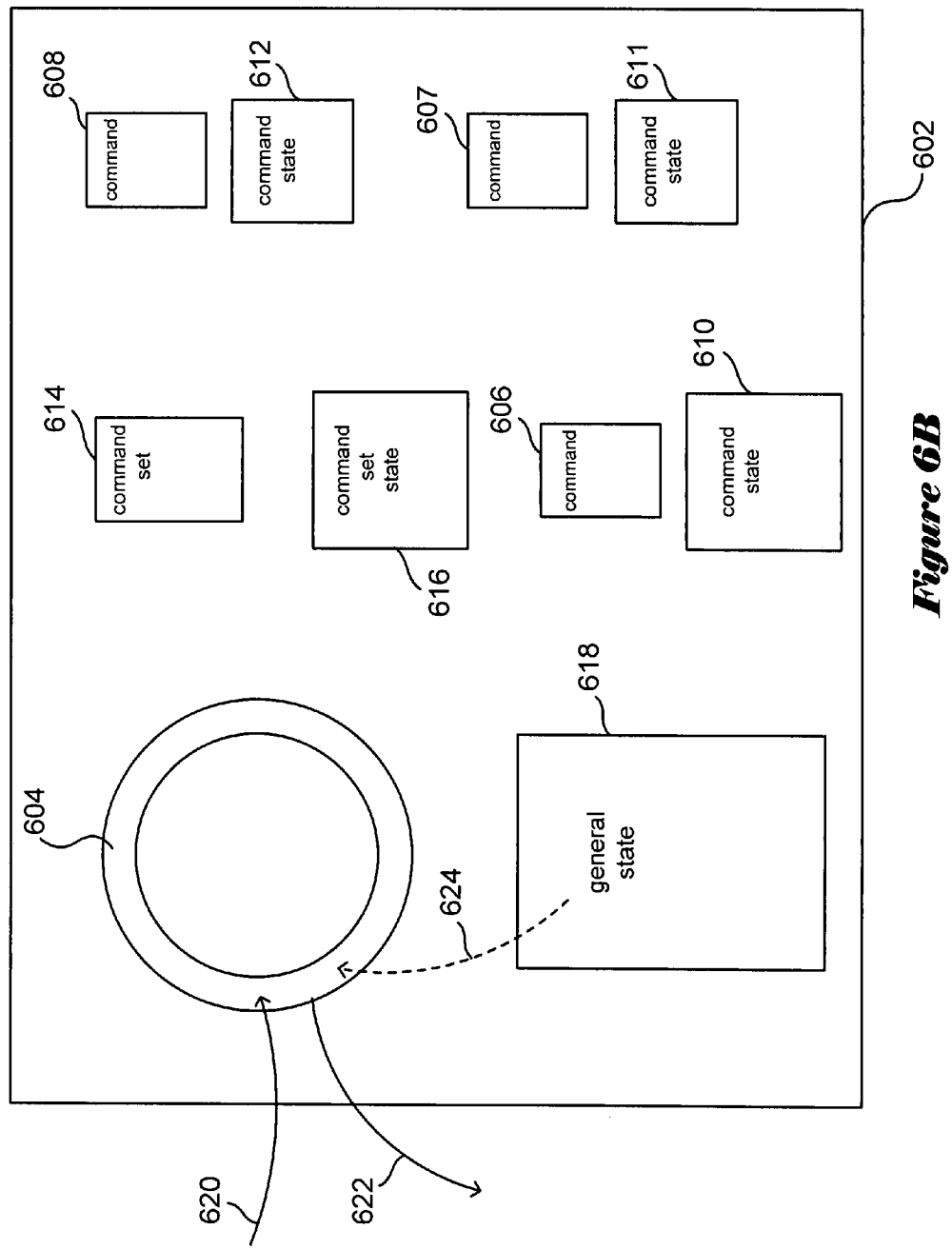
Figure 6C:
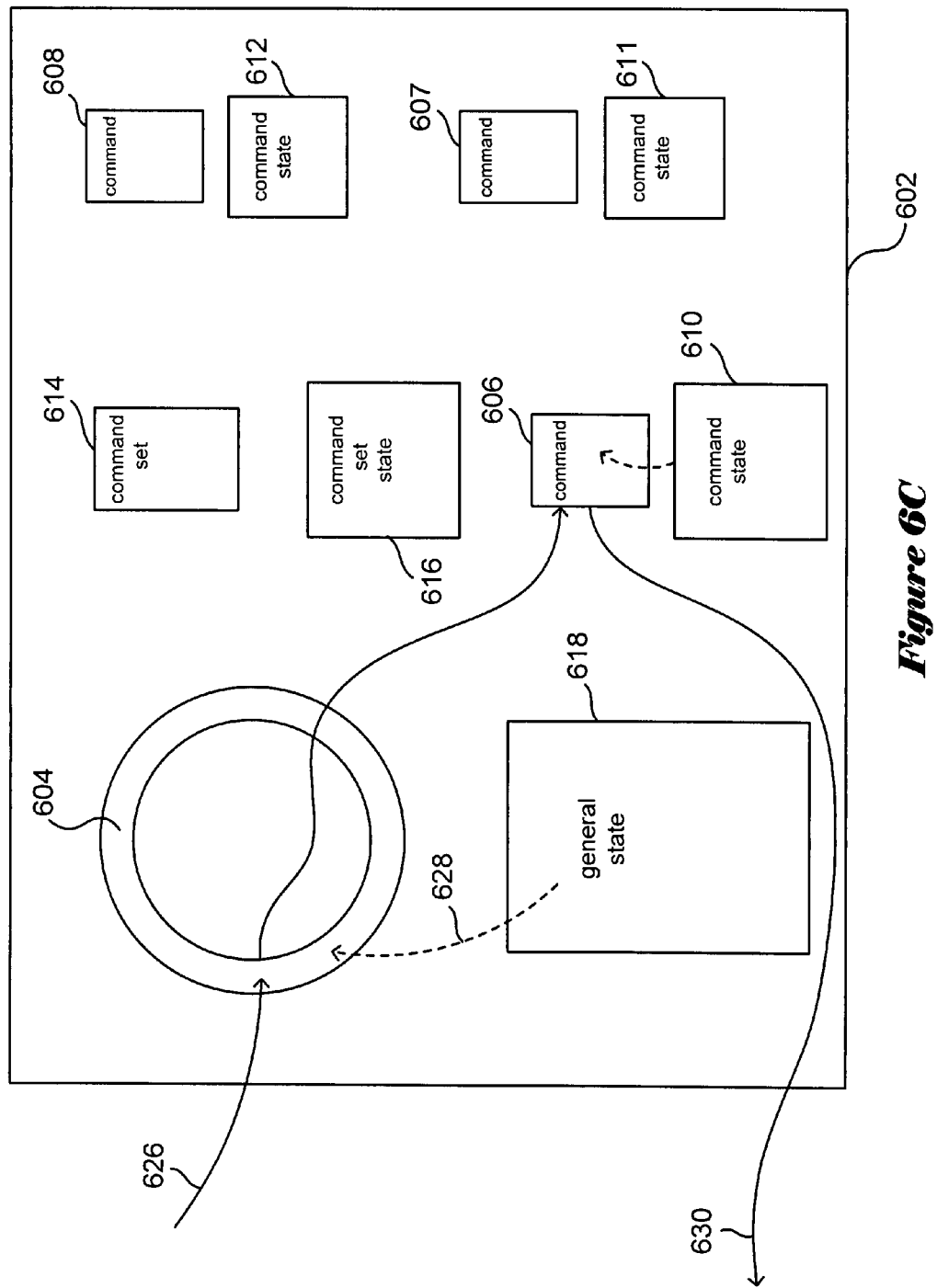
Figure 6D:
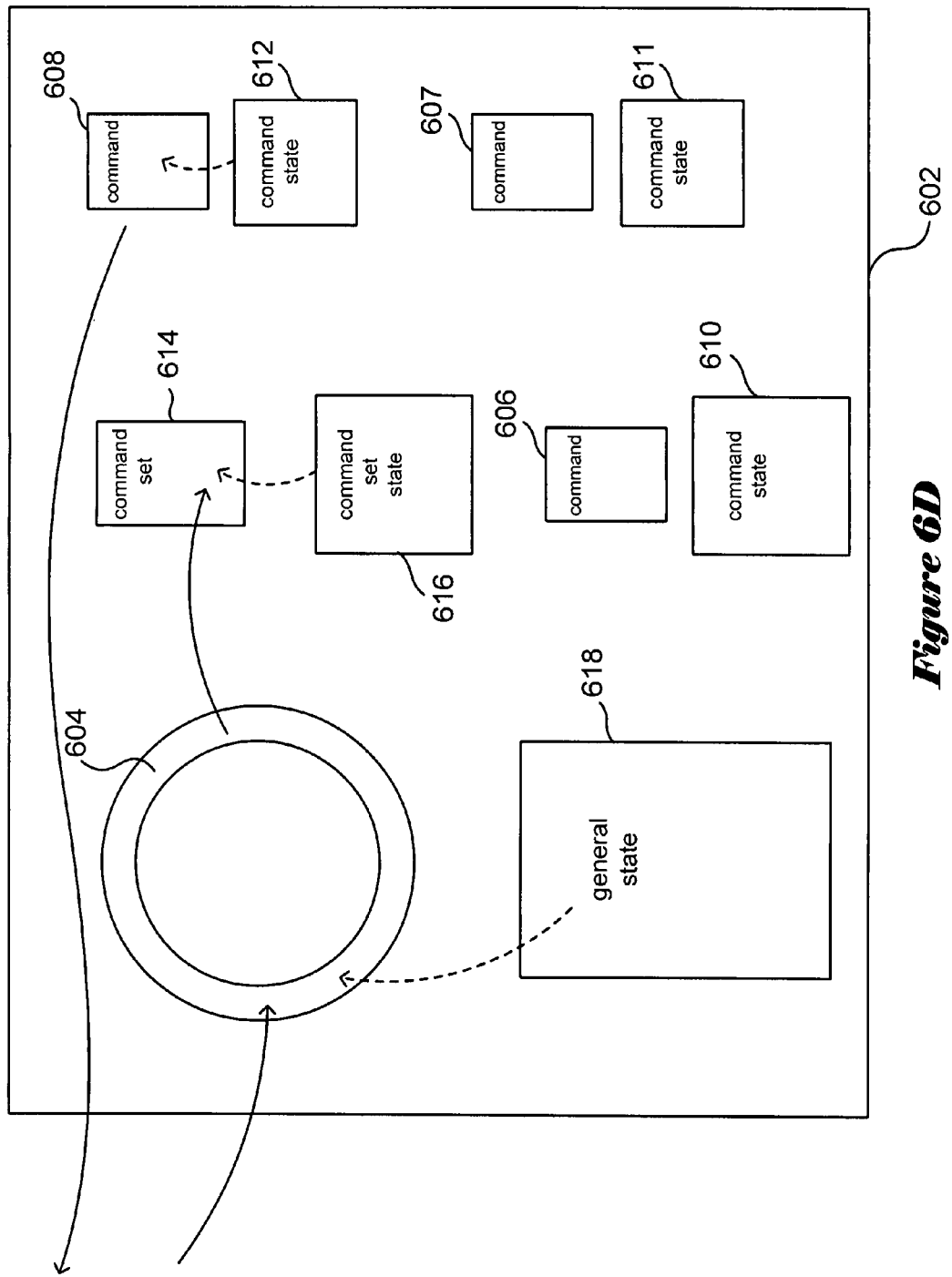

Certain types of commands, such as commands that solicit general information about a distributed data-storage system, may be executed by a general command-execution logic or program using only general state information 618. FIG. 6B illustrates processing of such commands. These general information or target-level configuration commands may be queued 620 and subsequently de-queued 622 and processed by general command-processing routines, using 624 only general state information 618 shared among all component data-storage systems that directly receive commands from remote host computers and that are therefore part of a distributed target within the distributed data-storage system. Execution of other types of commands may involve reference both to general state information as well as state information particular to the command. FIG. 6C illustrates processing of a command involving access to command-specific state information. The command is queued 626 and subsequently de-queued and partially processed with reference 628 to general state information 618, then processed by command-specific logic 606 with reference to command-specific state information 610 in order to return a response 630 to the host computer that initially sent the command. Finally, as shown in FIG. 6D, processing of an additional type of command may involve access to general state information, state information 616 associated with a set of commands to which the command belongs, and state information 612 associated with the particular command. Assuming a relatively uniform distribution of command types in the commands received by a component data-storage device, it would be reasonable to expect that the general state information 618 would be, by far, most frequently accessed, that command-specific information may be least frequently accessed, and that the intermediate-level state information associated with multiple commands, such as state information 616 in FIG. 6A, would be accessed with an intermediate frequency.

An additional basis for selecting management policies concerning shared state information is the frequency at which particular state information is modified during operation of a distributed computing system. For example, processing of the command discussed above with reference to 6B may involve simply accessing general state information, without modification of the state information or, on the other hand, may involve both accessing and modifying the general state information. Shared state information that is never modified, or infrequently modified, may be locally cached more efficiently than shared state information that is frequently modified, requiring frequent distributed updates.

In non-distributed systems, maintenance of shared state information is relatively straightforwardly handled by employing physical, shared memory and well-known techniques for resolving contention issues that arise from concurrent access to shared state information. However, in a distributed system, central storage of shared state information introduces severe communications bottlenecks and dangerous single points of failure. Instead, shared information is generally distributed among discrete component data-storage systems. But distribution of shared state information introduces consistency problems. When one component data-storage system receives a command that directs modification of shared state information, the modification is propagated to all other component data-storage systems that maintain copies of the shared state information. At the same time, the data-storage interface presented by a distributed data-storage system may specify that the distributed data-storage system presents to accessing remote host computers a system state that is consistent and predictably time ordered. Many data-storage interfaces specify that no two different, concurrently accessing remote host computers should ever observe inconsistent state of a distributed data-storage system at any point in time. Therefore, if a command is executed on a first component data-storage system that results in modification of shared state information, processing of commands that access or modify that shared state information are delayed on all other component data-storage systems until the modification made by the first component data-storage system is propagated to all other component data-storage systems. Thus, updating distributed, shared state information may involve significant communications overhead as well as markedly increased command-execution latencies.

The problems of distributed, shared state information within distributed data-storage systems, and other distributed computing systems, manifest themselves in myriad different ways in control programs for component data-storage systems, including in the sequencing and timing of command execution, inter-component communications, data-storage interface design. Management strategies for distributed, shared state information may potentially impact overall system processing speeds, command-execution bandwidths, integrity, and data-storage capacity. Various solutions have been proposed for handling the shared-state-information problem within distributed computing systems, most solutions involving either intricate and potentially brittle techniques based on periodic heartbeat messages, locking protocols, and other such devices, or involving high communications and processing overheads that may severely impact overall distributed-data-storage-system performance. Designers, manufacturers, component vendors, and users of distributed data-storage systems have all recognized the need for better, general techniques for managing distributed, shared state information within distributed data-storage systems, and other distributed computing systems.

Figure 7:
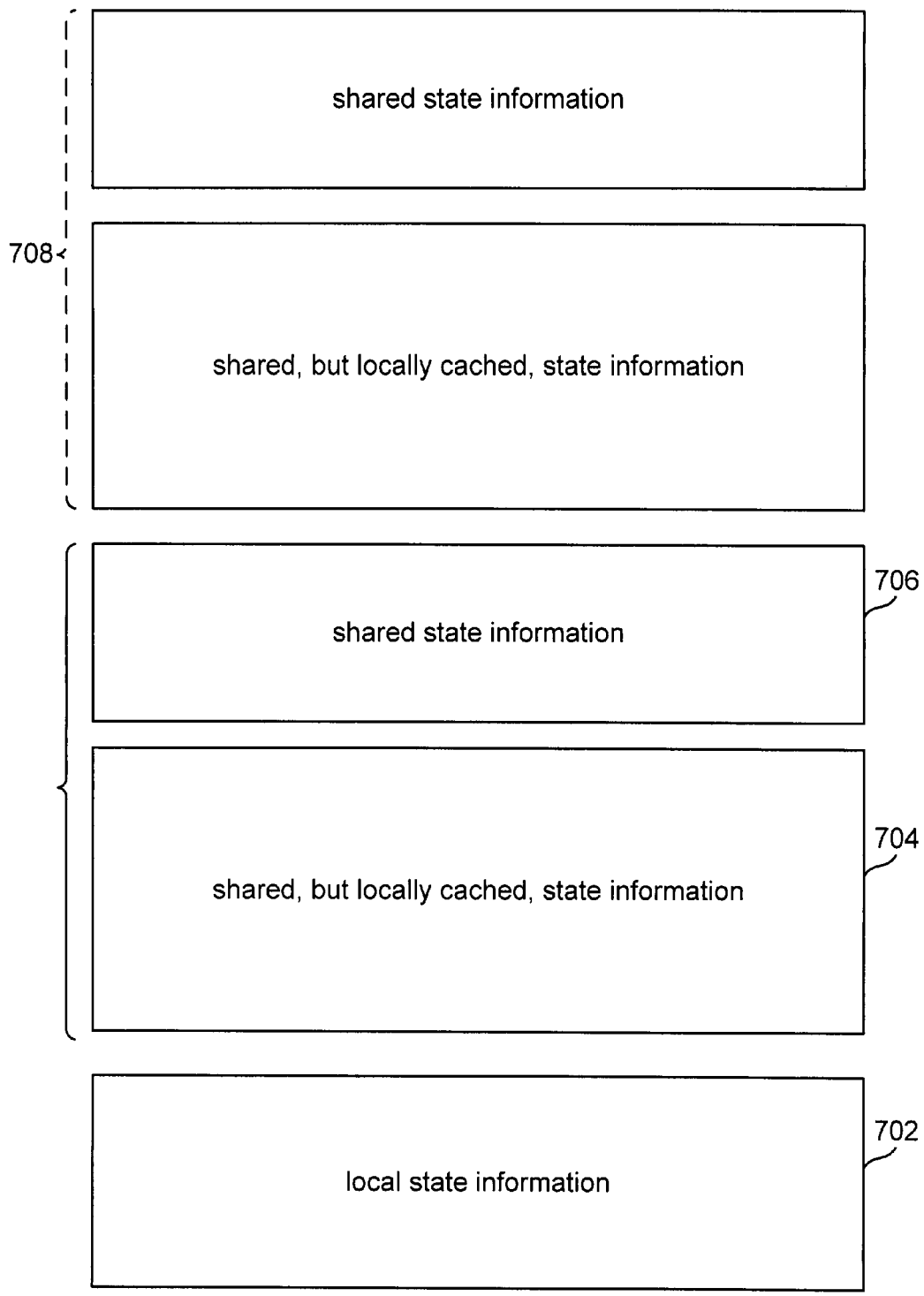
FIG. 7 illustrates an initial step in managing shared state information within distributed computing environments that represents one embodiment of the present invention.

FIG. 7 illustrates an initial step in managing shared state information within distributed computing environments that represents one embodiment of the present invention. In this initial step, the state information for the distributed data-storage system, or other distributed computing system, is partitioned into three types of state information: (1) local state information 702 that is particular to, and that can be completely managed by, a single component data-storage system; (2) distributed and shared, but locally cached, state information 704, subsequently referred to as "shared, cached state information," that is shared between multiple component data-storage devices but that can be locally cached in individual component data-storage systems for immediate read access, that is updated at a selected refresh frequency, and that is globally consistent among component data-storage systems by virtue of fully distributed write access; and (3) distributed shared state information 706, subsequently referred to simply as "shared state information," that is kept continuously consistent among the component data-storage systems that share the state information. In general, shared, cached state information is most useful for frequently read, but infrequently modified state information. In the case of complex distributed data-storage systems with internal hierarchies of distributed, shared state formation, there may be additional pairs of shared-state-information and shared-cached-state-information partitions, as indicated in FIG. 7 by the additional, optional partitions 708. However, for purposes of describing embodiments of the present invention, the subsequent discussion assumes that the state information within a distributed computing environment is partitioned into shared state information 706, shared, cached, state information 704, and local state information 702, without specific attention to multiple partitions of any particular type, since the management methods for each type are equivalently applied to one or more partitions of that type, with differences only in the values of constant parameters, such as refresh frequency, and in the number and identity of component data-storage systems that share a particular partition.

Having partitioned the state information contained in a distributed data-storage system into the three general partitions, or categories, discussed above with respect to FIG. 7, a next task is to assign each unit of state information, whether a byte, word, multi-word field, complex data structure, or larger unit of information, to one of the three partitions. State information that is used only by one component data-storage system of a distributed data-storage system, and that is managed only by that component data-storage system, can straightforwardly be assigned to the local state information partition 702 for that component data-storage system. There are few if any distribution and sharing issues related to such information, and therefore the local state information can be managed by any of many different alternative, well-known methods in order to maintain the local state information in a consistent state, in conformance to requirements imposed by the data-storage interface provided by the distributed, data-storage system and to the needs of the control program of the component data-storage system. By assigning as much state information as possible to the local-state-information partition of various component data-storage systems, the unavoidable overheads associated with distributed, shared state information in a distributed data-storage system can be significantly decreased.

The remaining state information, following assignment of local state information to local-state-information partitions of component data-storage systems, falls into the general class of distributed, shared state information. The distributed, shared state information is then partitioned among the shared-state-information partition 706 and the shared-cached-state-information partition 704. This partitioning of distributed, shared state information may vary from system to system and from system interface to system interface, depending on the capabilities of, and requirements imposed on, the physical and logical components of a distributed data-storage system. In general, savings in overhead due to management of distributed, shared state information is obtained when frequently accessed, but infrequently modified, state information is assigned to the shared-cached-state-information partition 704. Frequent access to a local cache is far more efficient than frequent access to distributed data through a communications media.

When locally cached information is frequently modified, distributed-state-information update procedures are frequently invoked, potentially increasing the overhead associated with shared, cached state information above that for shared state information that is stored and managed in a continuously consistent fashion. Frequently modified and/or infrequently accessed shared information may therefore be assigned to the shared-state-information partition 706. In certain cases, all shared state information may be assigned to the shared-cached-state-information partition 704 or, less commonly, to the shared-state-information partition 706. For example, if the communications and processing capacities of a distributed data-storage system are expansive, the overheads associated with managing shared state information in a continuously consistent and distributed fashion may not significantly impact overall system performance, and therefore the distributed management of distributed, shared state information by a single method may become attractive from a design and quality-control standpoint. As another example, the particular data-storage interface to which a distributed data-storage system is designed may not employ much shared state information that is frequently modified and that is continuously consistent, and therefore all the shared state information may be reasonably assigned to the shared-cached-state-information partition without significant impact to the overall performance of the distributed data-storage system. In the general case, in which shared state information is assigned to both shared-state-information and shared-cached-state-information partitions, the ratios of the amounts of state information stored in the two different partitions may significantly vary from distributed data-storage system to distributed data-storage system, and even at different points in time during operation of a given distributed data-storage system. The ratio may be empirically determined through performance analysis, or analytically determined by consideration of expected update frequencies, communications overheads, and other such factors.

Having partitioned the state information of a distributed data-storage system between the three general partitions discussed above, with reference to FIG. 7, methods for managing each of the two different partitions to which shared state information is assigned are employed. Embodiments of the present invention employ a next described, first method and protocol for managing shared state information assigned to the shared-state-information partition, and employ a second method and protocol for managing shared state information assigned to the shared-cached-state-information partition, subsequently described as an enhancement and elaboration of the first method and protocol.

A method for managing shared state information that is kept in a continuously consistent state, and a protocol on which the method is based, is described below in terms of a distributed storage register. A distributed storage register can be thought of, for the purpose of describing the present invention, as a unit of shared state information. Each unit of shared state information may be independently managed by the method and the protocol described below, may be managed using various types of control structures stored in distributed storage registers for managing collections of units of shared state information, or may be managed in larger collections of units of shared state information.

Figure 8:
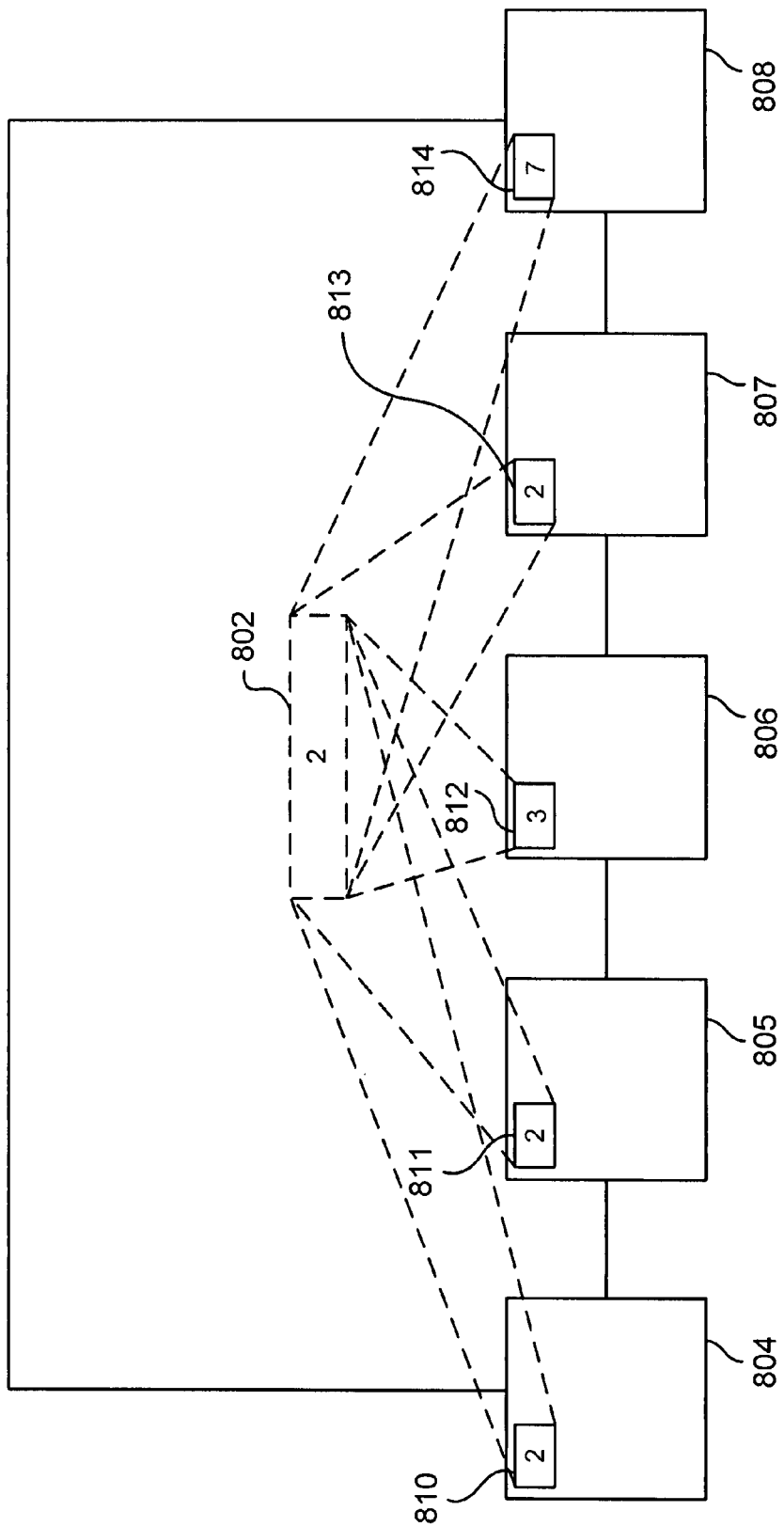
FIGS. 8-14 illustrate the basic operation of a distributed storage register used to implement various embodiments of the present invention.

FIGS. 8-14 illustrate the basic operation of a distributed storage register. As shown in FIG. 8, the distributed storage register 802 is preferably an abstract, or virtual, register, rather than a physical register implemented in the hardware of one particular electronic device. Each process running on a processor or computer system 804-808 employs a small number of values stored in dynamic memory, and optionally backed up in non-volatile memory, along with a small number of distributed-storage-register-related routines, to collectively implement the distributed storage register 802. At the very least, one set of stored values and routines is associated with each processing entity that accesses the distributed storage register. In some implementations, each process running on a physical processor or multi-processor system may manage its own stored values and routines and, in other implementations, processes running on a particular processor or multi-processor system may share the stored values and routines, providing that the sharing is locally coordinated to prevent concurrent access problems by multiple processes running on the processor.

In FIG. 8, each computer system maintains a local value 810-814 for the distributed storage register. In general, the local values stored by the different computer systems are normally identical, and equal to the value of the distributed storage register 802. However, occasionally the local values may not all be identical, as in the example shown in FIG. 8, in which case, if a majority of the computer systems currently maintain a single locally stored value, then the value of the distributed storage register is the majority-held value.

Figure 9:
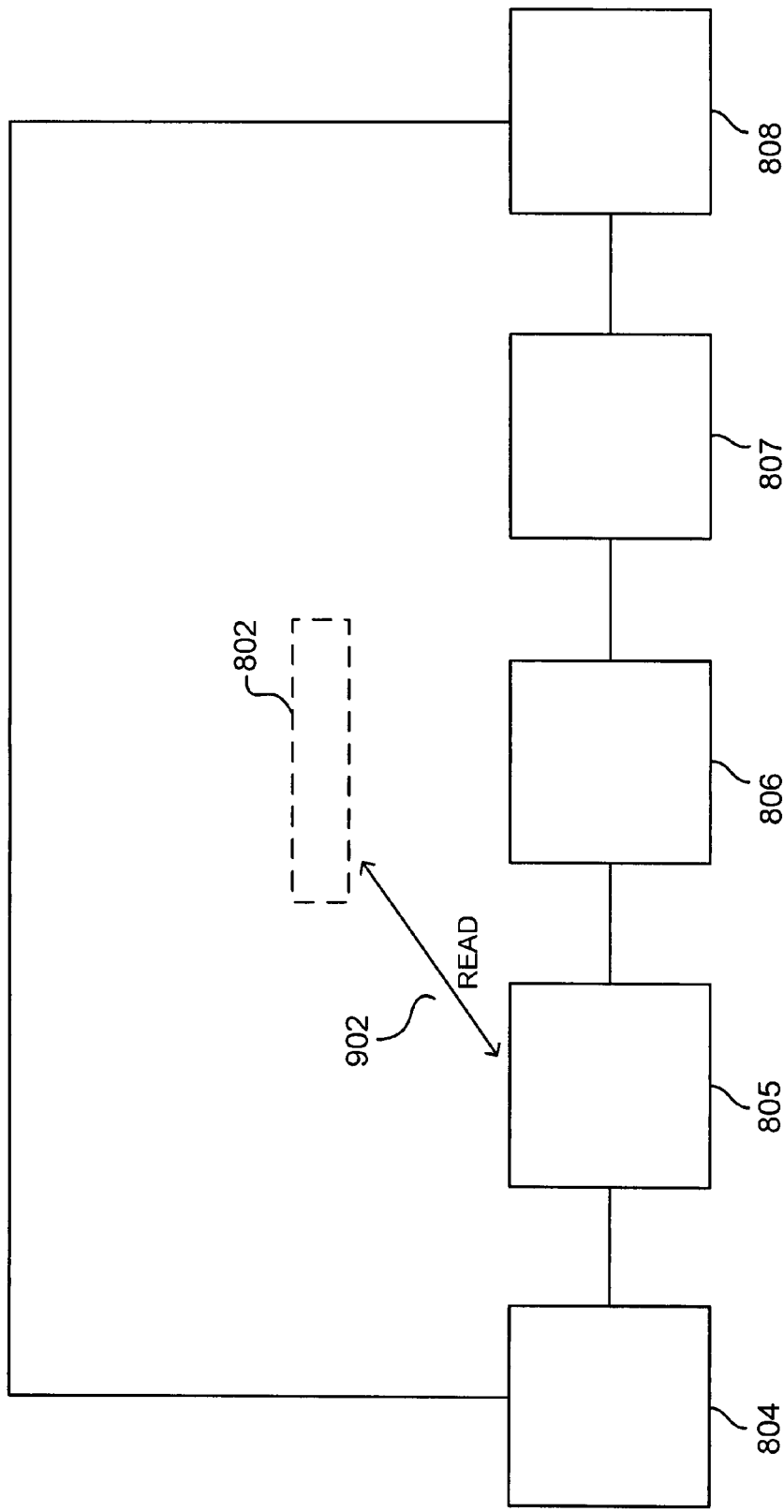
Figure 10:
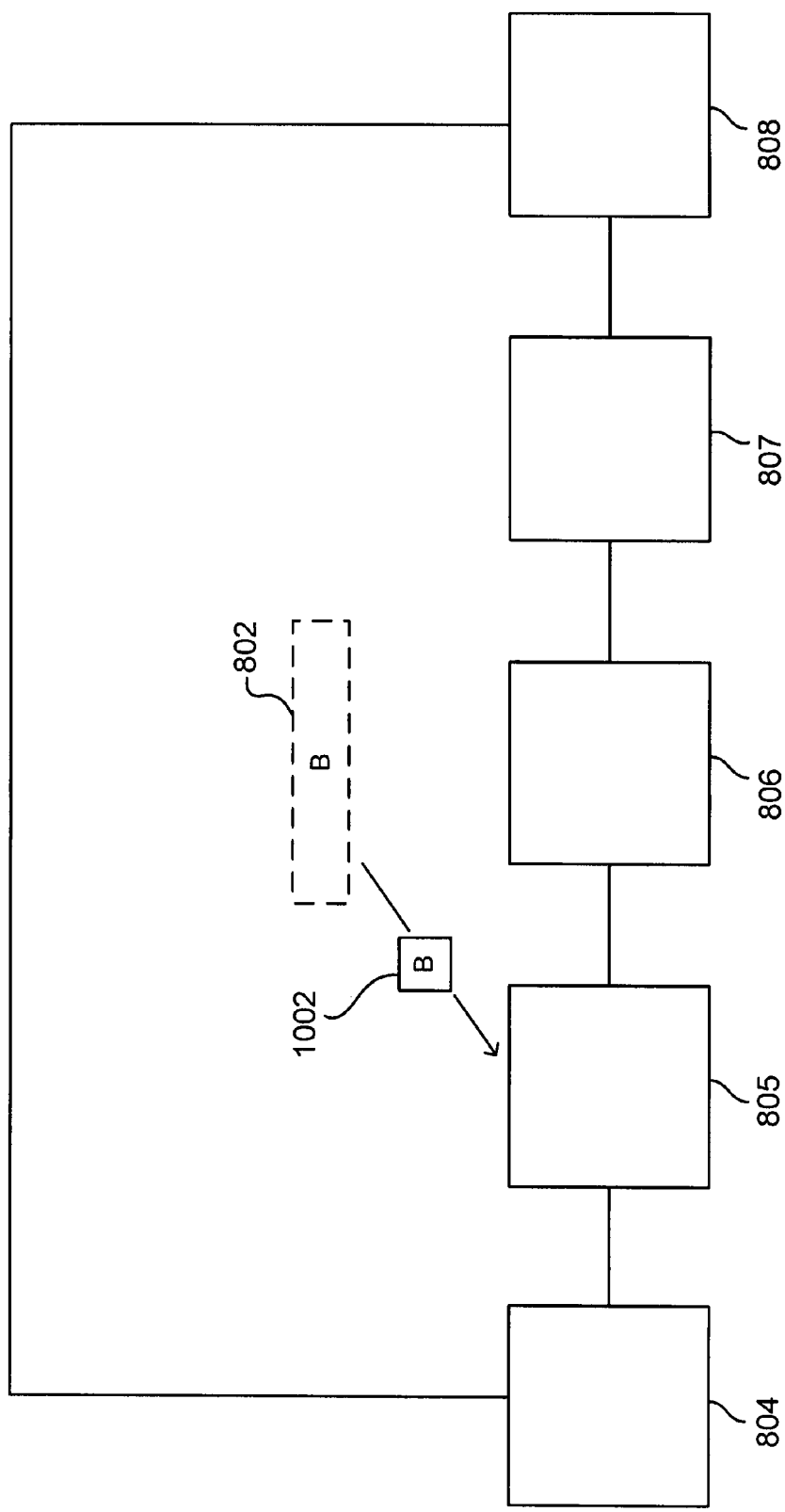
Figure 11:
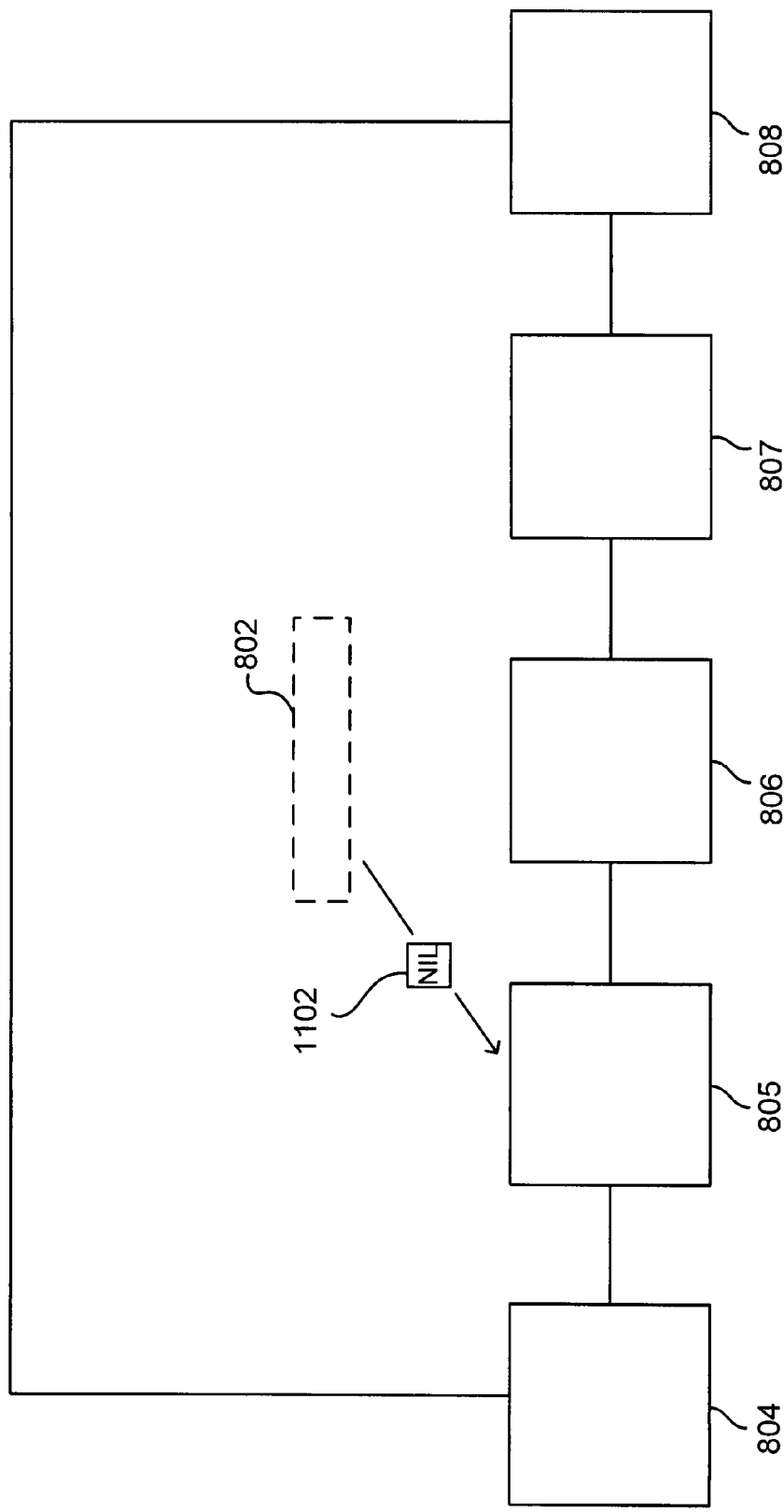

A distributed storage register provides two fundamental high-level functions to a number of intercommunicating processes that collectively implement the distributed storage register. As shown in FIG. 9, a process can direct a READ request 902 to the distributed storage register 802. If the distributed storage register currently holds a valid value, as shown in FIG. 10 by the value "B" within the distributed storage register 802, the current, valid value is returned 1002 to the requesting process. However, as shown in FIG. 11, if the distributed storage register 802 does not currently contain a valid value, then the value NIL 1102 is returned to the requesting process. The value NIL is a value that cannot be a valid value stored within the distributed storage register.

Figure 12:
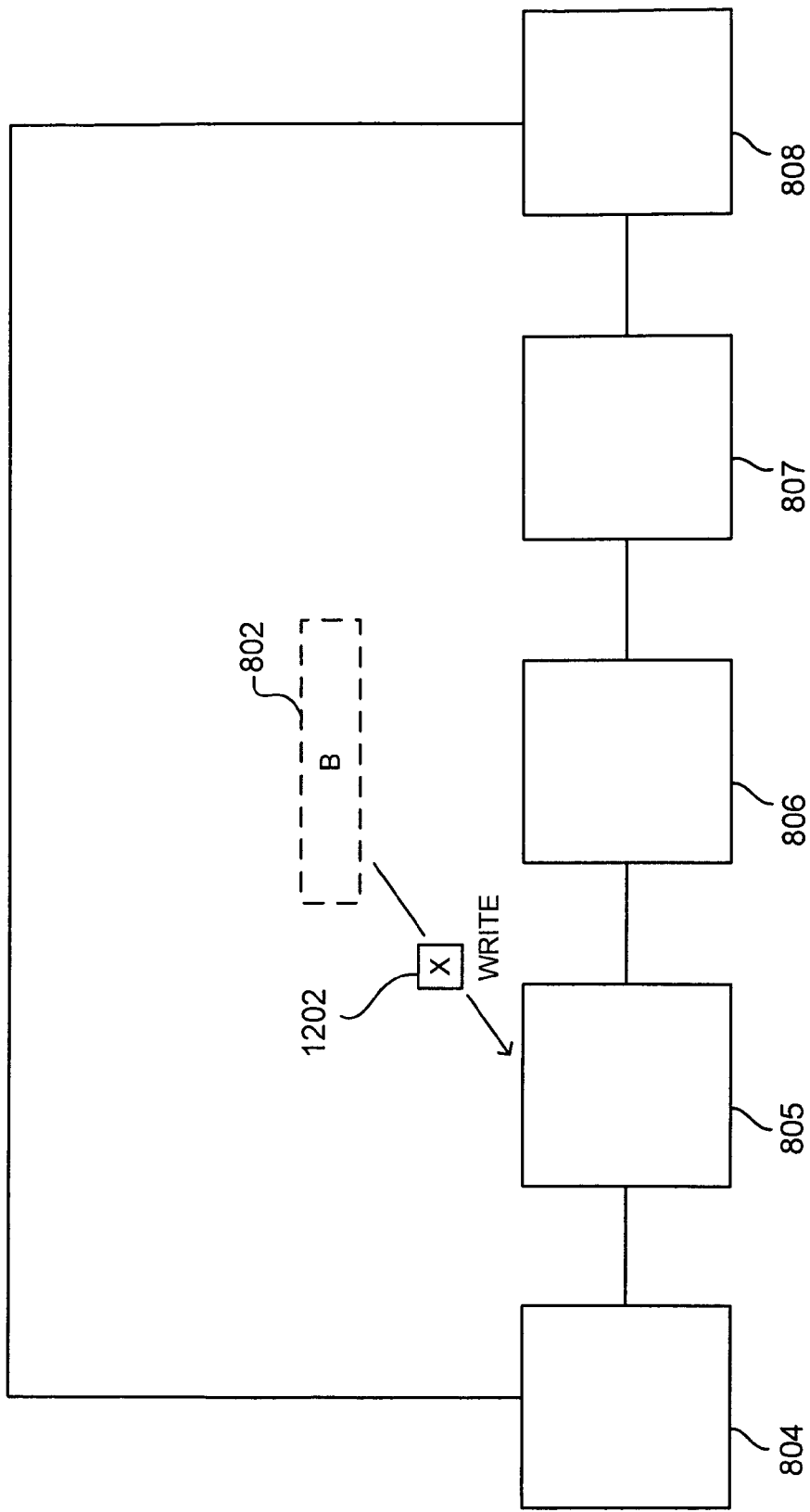
Figure 13:
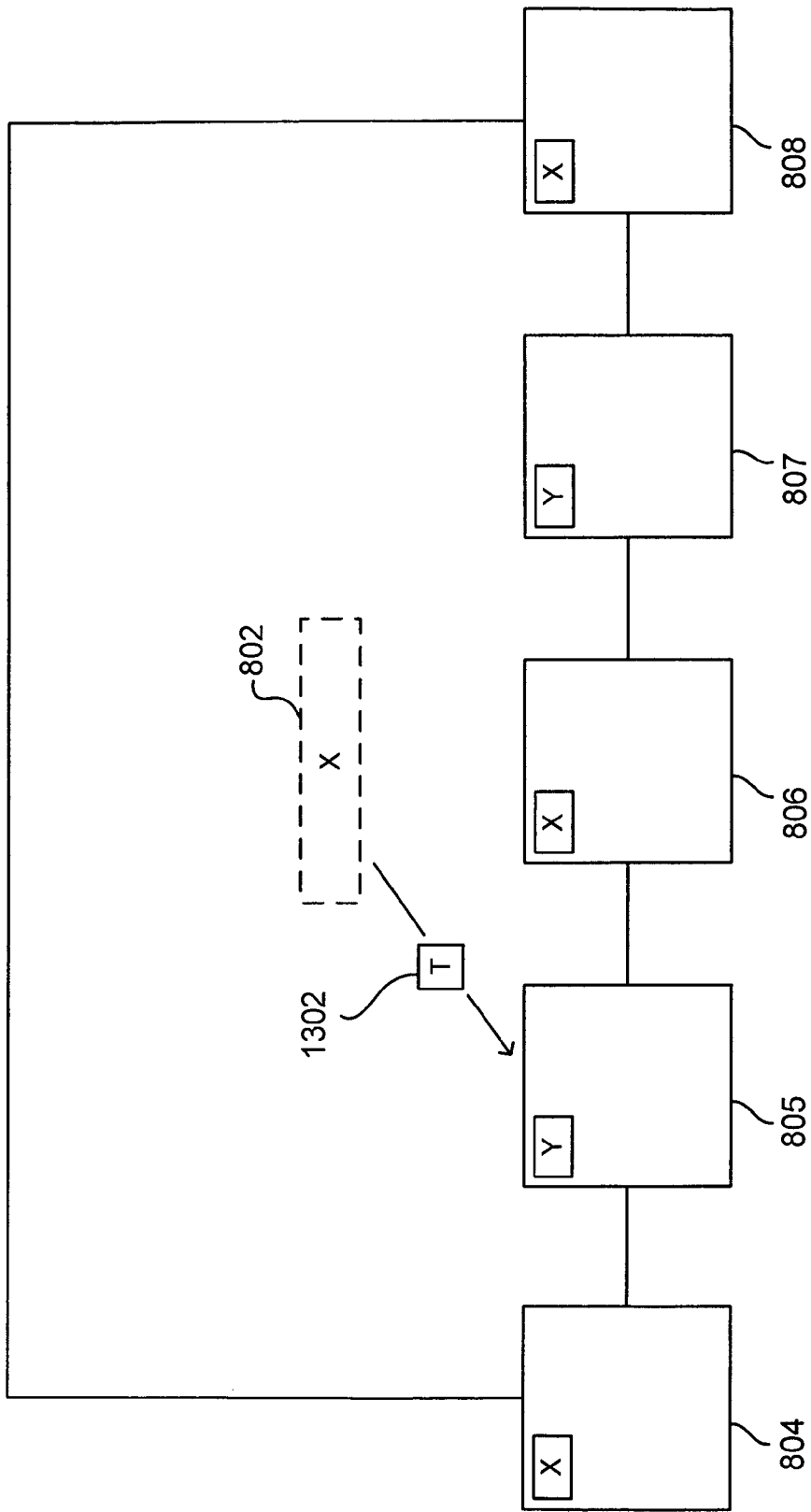
Figure 14:
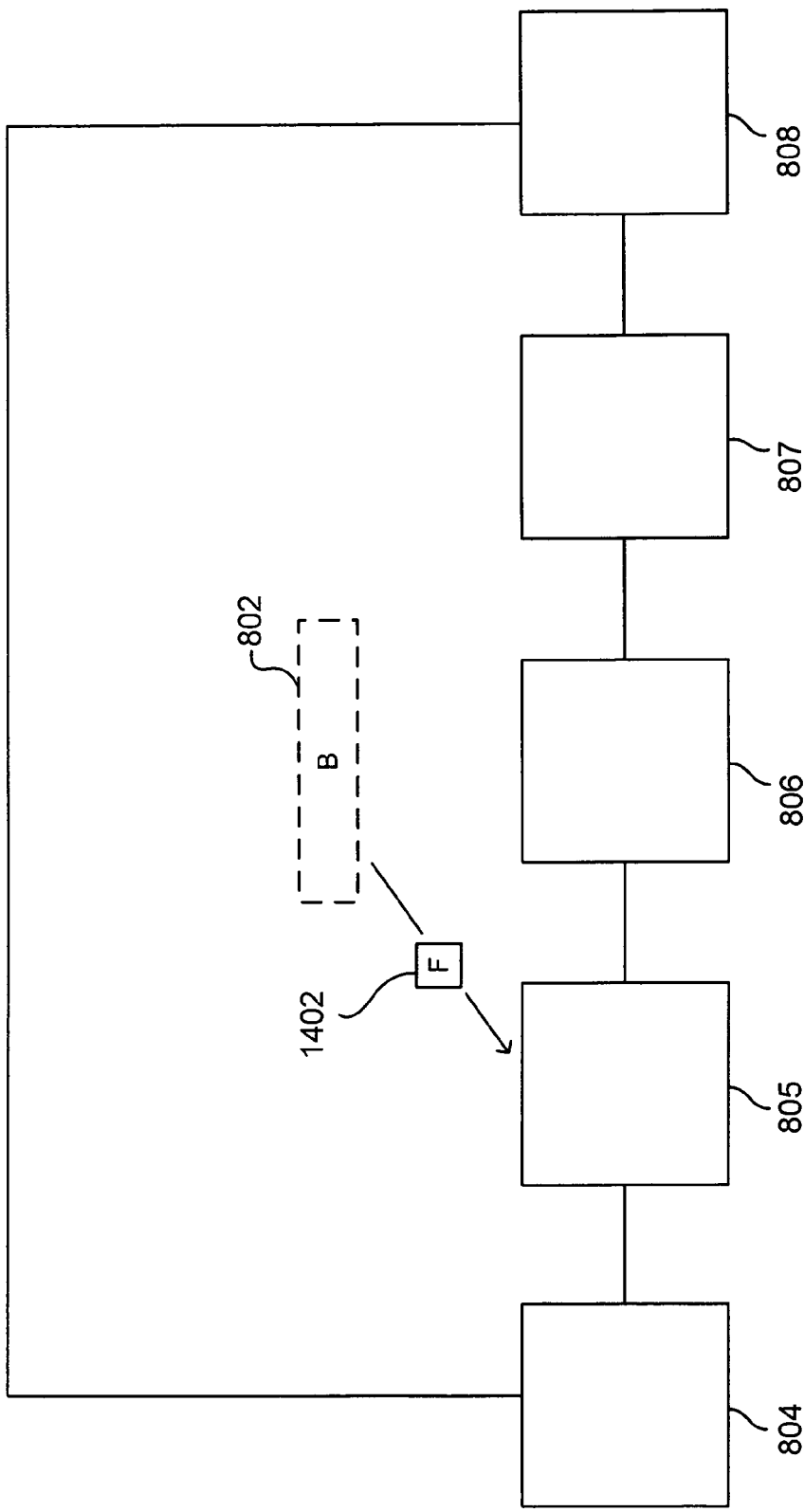

A process may also write a value to the distributed storage register. In FIG. 12, a process directs a WRITE message 1202 to the distributed storage register 802, the WRITE message 1202 including a new value "X" to be written to the distributed storage register 802. If the value transmitted to the distributed storage register successfully overwrites whatever value is currently stored in the distributed storage register, as shown in FIG. 13, then a Boolean value "TRUE" is returned 1302 to the process that directed the WRITE request to the distributed storage register. Otherwise, as shown in FIG. 14, the WRITE request fails, and a Boolean value "FALSE" is returned 1402 to the process that directed the WRITE request to the distributed storage register, the value stored in the distributed storage register unchanged by the WRITE request. In certain implementations, the distributed storage register returns binary values "OK" and "NOK," equivalent to the Boolean values "TRUE" and "FALSE."

Figure 15:
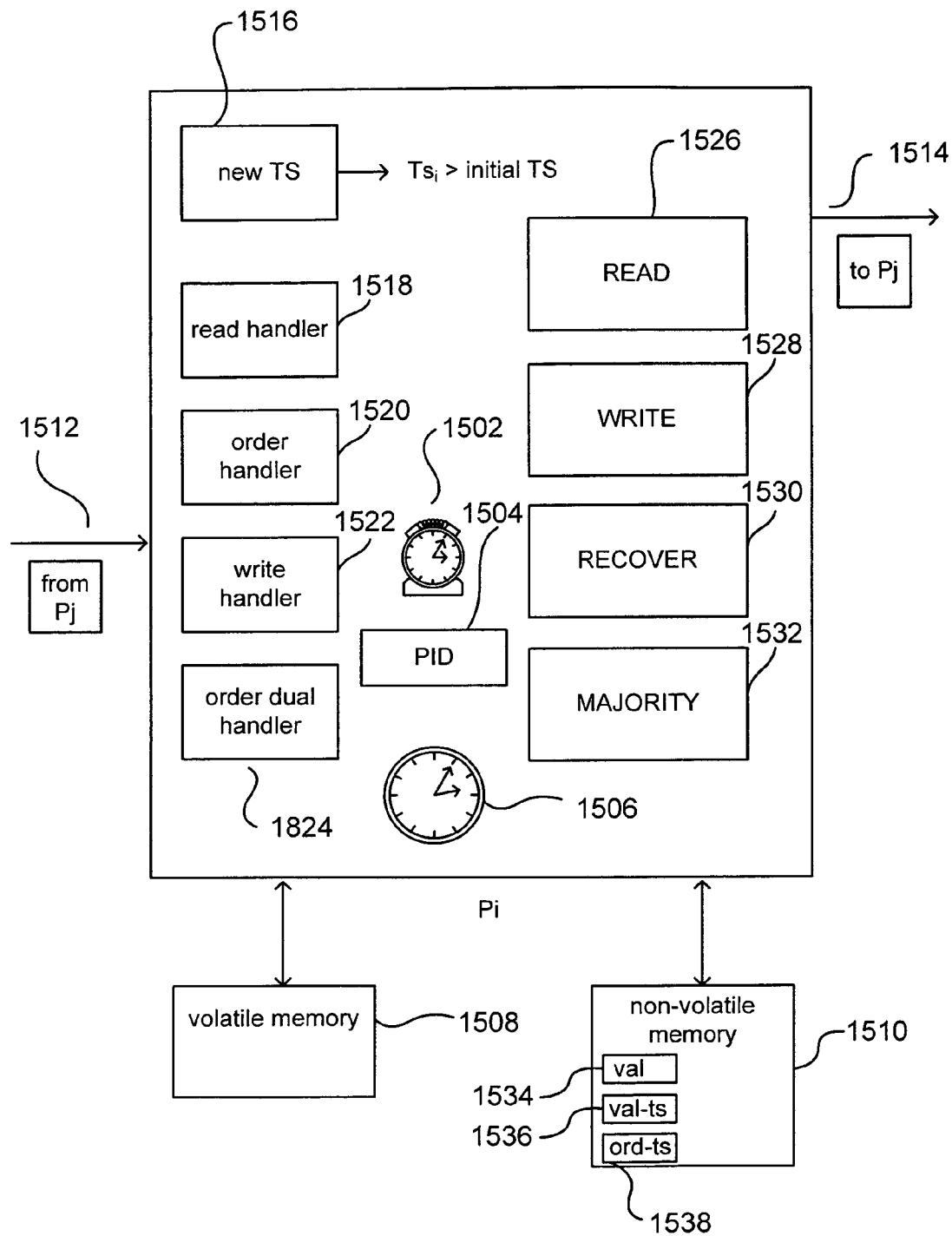
FIG. 15 shows the components used by a process or processing entity $P_i$ that implements, along with a number of other processes and/or processing entities, $P_{j \neq i}$, a distributed storage register employed in various embodiments of the present invention.

FIG. 15 shows the components used by a process or processing entity $P_i$ that implements, along with a number of other processes and/or processing entities, $P_{j \neq i}$, a distributed storage register. A processor or processing entity uses three low level primitives: a timer mechanism 1502, a unique ID 1504, and a clock 1506. The processor or processing entity $P_i$ uses a local timer mechanism 1502 that allows $P_i$ to set a timer for a specified period of time, and to then wait for that timer to expire, with $P_i$ notified on expiration of the timer in order to continue some operation. A process can set a timer and continue execution, checking or polling the timer for expiration, or a process can set a timer, suspend execution, and be re-awakened when the timer expires. In either case, the timer allows the process to logically suspend an operation, and subsequently resume the operation after a specified period of time, or to perform some operation for a specified period of time, until the timer expires. The process or processing entity $P_i$ also has a reliably stored and reliably retrievable local process ID ("PID") 1504. Each processor or processing entity has a local PID that is unique with respect to all other processes and/or processing entities that together implement the distributed storage register. Finally, the processor processing entity $P_i$ has a real-time clock 1506 that is roughly coordinated with some absolute time. The real-time clocks of all the processes and/or processing entities that together collectively implement a distributed storage register need not be precisely synchronized, but should be reasonably reflective of some shared conception of absolute time. Most computers, including personal computers, include a battery-powered system clock that reflects a current, universal time value. For most purposes, including implementation of a distributed storage register, these system clocks need not be precisely synchronized, but only approximately reflective of a current universal time.

Each processor or processing entity $P_i$ includes a volatile memory 1508 and, in some embodiments, a non-volatile memory 1510. The volatile memory 1508 is used for storing instructions for execution and local values of a number of variables used for the distributed-storage-register protocol. The non-volatile memory 1510 is used for persistently storing the number of variables used, in some embodiments, for the distributed-storage-register protocol. Persistent storage of variable values provides a relatively straightforward resumption of a process's participation in the collective implementation of a distributed storage register following a crash or communications interruption. However, persistent storage is not required. Instead, as long as the variable values stored in dynamic memory, in non-persistent-storage embodiments, if lost, are all lost together, and provided that the variables are properly re-initialized, the distributed storage register protocol correctly operates, and progress of processes and processing entities using the distributed storage register is maintained. Each process $P_i$ stores three variables: (1) val 1534, which holds the current, local value for the distributed storage register; (2) val-ts 1536, which indicates the time-stamp value associated with the current local value for the distributed storage register; and (3) ord-ts 1538, which indicates the most recent time stamp associated with a WRITE operation. The variable val is initialized, particularly in non-persistent-storage embodiments, to a value NIL that is different from any value written to the distributed storage register by processes or processing entities, and that is, therefore, distinguishable from all other distributed-storage-register values. Similarly, the values of variables val-ts and ord-ts are initialized to the value "initialTS," a value less than any time-stamp value returned by a routine "newTS" used to generate time-stamp values. Providing that val, val-ts, and ord-ts are together re-initialized to these values, the collectively implemented distributed storage register tolerates communications interruptions and process and processing entity crashes, provided that at least a majority of processes and processing entities recover and resume correction operation.

Each processor or processing entity $P_i$ may be interconnected to the other processes and processing entities $P_{j \neq i}$ via a message-based network in order to receive 1512 and send 1514 messages to the other processes and processing entities $P_{j \neq i}$. Each processor or processing entity $P_i$ includes a routine "newTS" 1516 that returns a time stamp $TS_i$ when called, the time stamp $TS_i$ greater than some initial value "initialTS." Each time the routine "newTS" is called, it returns a time stamp $TS_i$ greater than any time stamp previously returned. Also, any time stamp value $TS_i$ returned by the newTS called by a processor or processing entity $P_i$ should be different from any time stamp TSj returned by newTS called by any other processor processing entity $P_j$. One practical method for implementing newTS is for newTS to return a time stamp TS comprising the concatenation of the local PID 1504 with the current time reported by the system clock 1506. Each processor or processing entity $P_i$ that implements the distributed storage register includes four different handler routines: (1) a READ handler 1518; (2) an ORDER handler 1520; (3) a WRITE handler 1522; and (4) an ORDER&READ handler 1524. It is important to note that handler routines should be implemented as critical sections, or single threaded by locks, to prevent race conditions in testing and setting local variable values. Each processor or processing entity $P_i$ also has four operational routines: (1) READ 1526; (2) WRITE 1528; (3) RECOVER 1530; and (4) MAJORITY 1532. Both the four handler routines and the four operational routines are discussed in detail, below.

Correct operation of a distributed storage register, and liveness, or progress, of processes and processing entities using a distributed storage register depends on a number of assumptions. Each process or processing entity $P_i$ is assumed to not behave maliciously. In other words, each processor or processing entity $P_i$ faithfully adheres to the distributed-storage-register protocol. Another assumption is that a majority of the processes and/or processing entities $P_i$ that collectively implement a distributed storage register either never crash or eventually stop crashing and execute reliably. As discussed above, a distributed storage register implementation is tolerant to lost messages, communications interruptions, and process and processing entity crashes that affect, at any given time, a minority of processes and processing entities. As mentioned above, all of the processes and/or processing entities are fully interconnected by a message-based network. The message-based network is asynchronous, with no bounds on message-transmission times. However, a fair-loss property for the network is assumed, which essentially guarantees that if $P_i$ receives a message m from $P_j$, then $P_j$ sent the message m, and also essentially guarantees that if $P_i$ repeatedly transmits the message m to $P_j$, $P_j$ will eventually receive message m, if $P_j$ is a correct process or processing entity. Again, as discussed above, it is assumed that the system clocks for all processes or processing entities are all reasonably reflective of some shared time standard, but need not be precisely synchronized.

These assumptions are useful to prove correctness of the distributed-storage-register protocol and to guarantee progress. However, in practical implementations, one or more of the assumptions may be violated, and a reasonably correct and useful distributed storage register obtained. In addition, additional safeguards may be built into the handler routines and operational routines in order to overcome particular deficiencies in the hardware platforms and processing entities.

Figure 16:
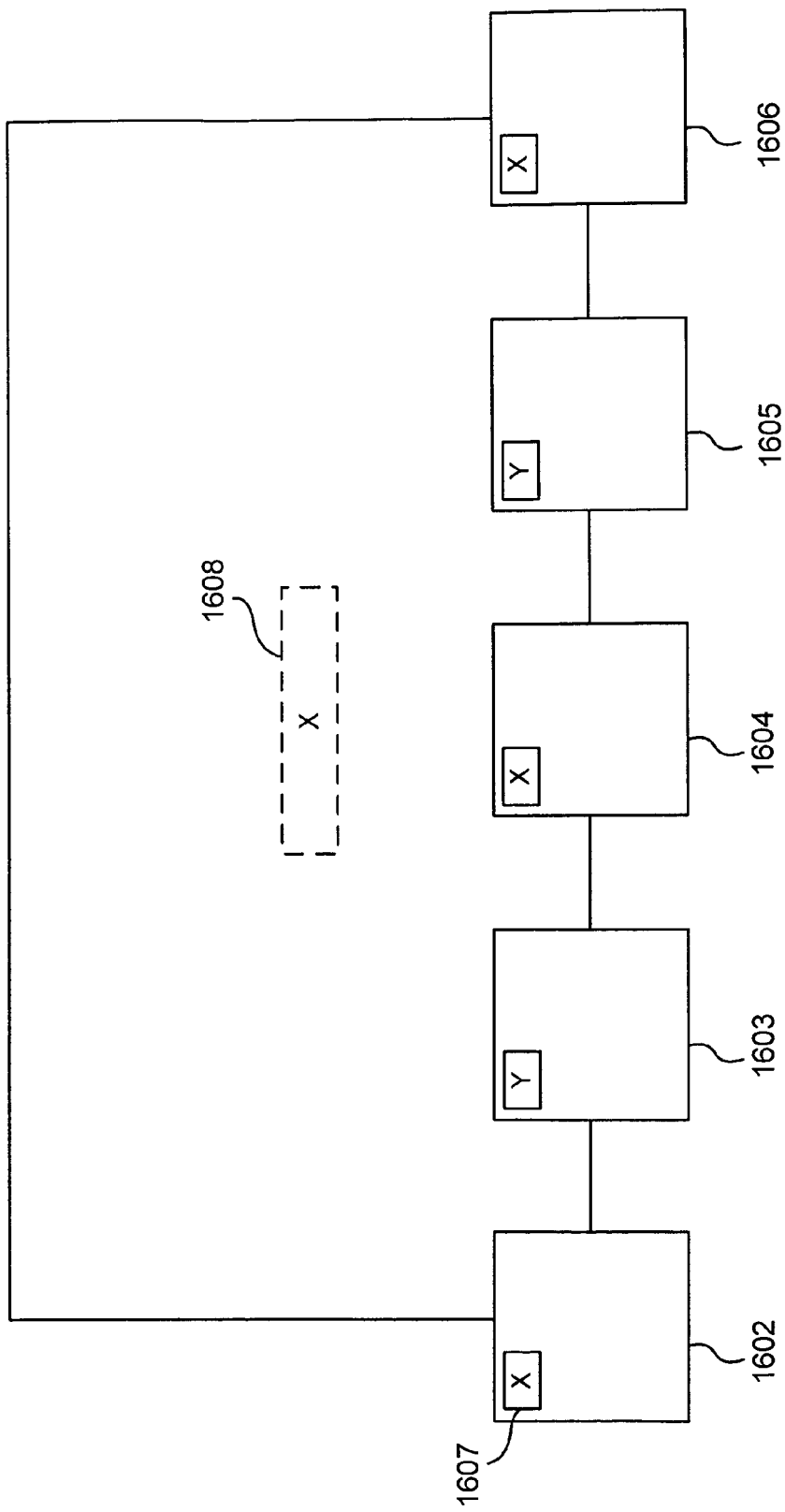
FIG. 16 illustrates determination of the current value of a distributed storage register by means of a quorum, used in various embodiments of the present invention.

Operation of the distributed storage register is based on the concept of a quorum. FIG. 16 illustrates determination of the current value of a distributed storage register by means of a quorum. FIG. 16 uses similar illustration conventions as used in FIGS. 8-14. In FIG. 16, each of the processes or processing entities 1602-1606 maintains the local variable, val-ts, such as local variable 1607 maintained by process or processing entity 1602, that holds a local time-stamp value for the distributed storage register. If, as in FIG. 16, a majority of the local values maintained by the various processes and/or processing entities that collectively implement the distributed storage register currently agree on a time-stamp value val-ts, associated with the distributed storage register, then the current value of the distributed storage register 1608 is considered to be the value of the variable val held by the majority of the processes or processing entities. If a majority of the processes and processing entities cannot agree on a time-stamp value val-ts, or there is no single majority-held value, then the contents of the distributed storage register are undefined. However, a minority-held value can be then selected and agreed upon by a majority of processes and/or processing entities, in order to recover the distributed storage register.

FIG. 17 shows pseudocode implementations for the routine handlers and operational routines shown diagrammatically in FIG. 15. It should be noted that these pseudocode implementations omit detailed error handling and specific details of low-level communications primitives, local locking, and other details that are well understood and straightforwardly implemented by those skilled in the art of computer programming. The routine "majority" 1702 sends a message, on line 2, from a process or processing entity $P_i$ to itself and to all other processes or processing entities $P_{j \neq i}$, that, together with $P_i$, collectively implement a distributed storage register. The message is periodically resent, until an adequate number of replies are received, and, in many implementations, a timer is set to place a finite time and execution limit on this step. Then, on lines 3-4, the routine "majority" waits to receive replies to the message, and then returns the received replies on line 5. The assumption that a majority of processes are correct, discussed above, essentially guarantees that the routine "majority" will eventually return, whether or not a timer is used. In practical implementations, a timer facilitates handling error occurrences in a timely manner. Note that each message is uniquely identified, generally with a time stamp or other unique number, so that replies received by process $P_i$ can be correlated with a previously sent message.

The routine "read" 1704 reads a value from the distributed storage register. On line 2, the routine "read" calls the routine "majority" to send a READ message to itself and to each of the other processes or processing entities $P_{j \neq i}$. The READ message includes an indication that the message is a READ message, as well as the time-stamp value associated with the local, current distributed storage register value held by process $P_i$, val-ts. If the routine "majority" returns a set of replies, all containing the Boolean value "TRUE," as determined on line 3, then the routine "read" returns the local current distributed-storage-register value, val. Otherwise, on line 4, the routine "read" calls the routine "recover."

The routine "recover" 1706 seeks to determine a current value of the distributed storage register by a quorum technique. First, on line 2, a new time stamp ts is obtained by calling the routine "newTS." Then, on line 3, the routine "majority" is called to send ORDER&READ messages to all of the processes and/or processing entities. If any status in the replies returned by the routine "majority" are "FALSE," then "recover" returns the value NIL, on line 4. Otherwise, on line 5, the local current value of the distributed storage register, val, is set to the value associated with the highest value time stamp in the set of replies returned by routine "majority." Next, on line 6, the routine "majority" is again called to send a WRITE message that includes the new time stamp ts, obtained on line 2, and the new local current value of the distributed storage register, val. If the status in all the replies has the Boolean value "TRUE," then the WRITE operation has succeeded, and a majority of the processes and/or processing entities now concur with that new value, stored in the local copy val on line 5. Otherwise, the routine "recover" returns the value NIL.

The routine "write" 1708 writes a new value to the distributed storage register. A new time stamp, ts, is obtained on line 2. The routine "majority" is called, on line 3, to send an ORDER message, including the new time stamp, to all of the processes and/or processing entities. If any of the status values returned in reply messages returned by the routine "majority" are "FALSE," then the value "NOK" is returned by the routine "write," on line 4. Otherwise, the value val is written to the other processes and/or processing entities, on line 5, by sending a WRITE message via the routine "majority." If all the status vales in replies returned by the routine "majority" are "TRUE," as determined on line 6, then the routine "write" returns the value "OK." Otherwise, on line 7, the routine "write" returns the value "NOK." Note that, in both the case of the routine "recover" 1706 and the routine "write," the local copy of the distributed-storage-register value val and the local copy of the time stamp value val-ts are both updated by local handler routines, discussed below.

Next, the handler routines are discussed. At the onset, it should be noted that the handler routines compare received values to local-variable values, and then set local variable values according to the outcome of the comparisons. These types of operations should be strictly serialized, and protected against race conditions within each process and/or processing entity. Local serialization is easily accomplished using critical sections or local locks based on atomic test-and-set instructions. The READ handler routine 1710 receives a READ message, and replies to the READ message with a status value that indicates whether or not the local copy of the time stamp val-ts in the receiving process or entity is equal to the time stamp received in the READ message, and whether or not the time stamp ts received in the READ message is greater than or equal to the current value of a local variable ord-ts. The WRITE handler routine 1712 receives a WRITE message determines a value for a local variable status, on line 2, that indicates whether or not the local copy of the time stamp val-ts in the receiving process or entity is greater than the time stamp received in the WRITE message, and whether or not the time stamp ts received in the WRITE message is greater than or equal to the current value of a local variable ord-ts. If the value of the status local variable is "TRUE," determined on line 3, then the WRITE handler routine updates the locally stored value and time stamp, val and val-ts, on lines 4-5, both in dynamic memory and in persistent memory, with the value and time stamp received in the WRITE message. Finally, on line 6, the value held in the local variable status is returned to the process or processing entity that sent the WRITE message handled by the WRITE handler routine 1712.

The ORDER&READ handler 1714 computes a value for the local variable status, on line 2, and returns that value to the process or processing entity from which an ORDER&READ message was received. The computed value of status is a Boolean value indicating whether or not the time stamp received in the ORDER&READ message is greater than both the values stored in local variables val-ts and ord-ts. If the computed value of status is "TRUE," then the received time stamp ts is stored into both dynamic memory and persistent memory in the variable ord-ts.

Similarly, the ORDER handler 1716 computes a value for a local variable status, on line 2, and returns that status to the process or processing entity from which an ORDER message was received. The status reflects whether or not the received time stamp is greater than the values held in local variables val-ts and ord-ts. If the computed value of status is "TRUE," then the received time stamp ts is stored into both dynamic memory and persistent memory in the variable ord-ts.

Using the distributed storage register method and protocol, discussed above, shared state information that is continuously consistently maintained in a distributed data-storage system can be stored in a set of distributed storage registers, one unit of shared state information per register. The size of a register may vary to accommodate different natural sizes of units of shared state information. The granularity of state information units can be determined by performance monitoring, or by analysis of expected exchange rates of units of state information within a particular distributed system. Larger units incur less overhead for protocol variables and other data maintained for a distributed storage register, but may result in increased communications overhead if different portions of the units are accessed at different times. It should also be noted that, while the above pseudocode and illustrations are directed to implementation of a single distributed storage register, these pseudocode routines can be generalized by adding parameters identifying a particular distributed storage register, of unit of state information, to which operations are directed, and by maintaining arrays of variables, such as val-ts, val, and ord-ts, indexed by the identifying parameters.

Figure 18:
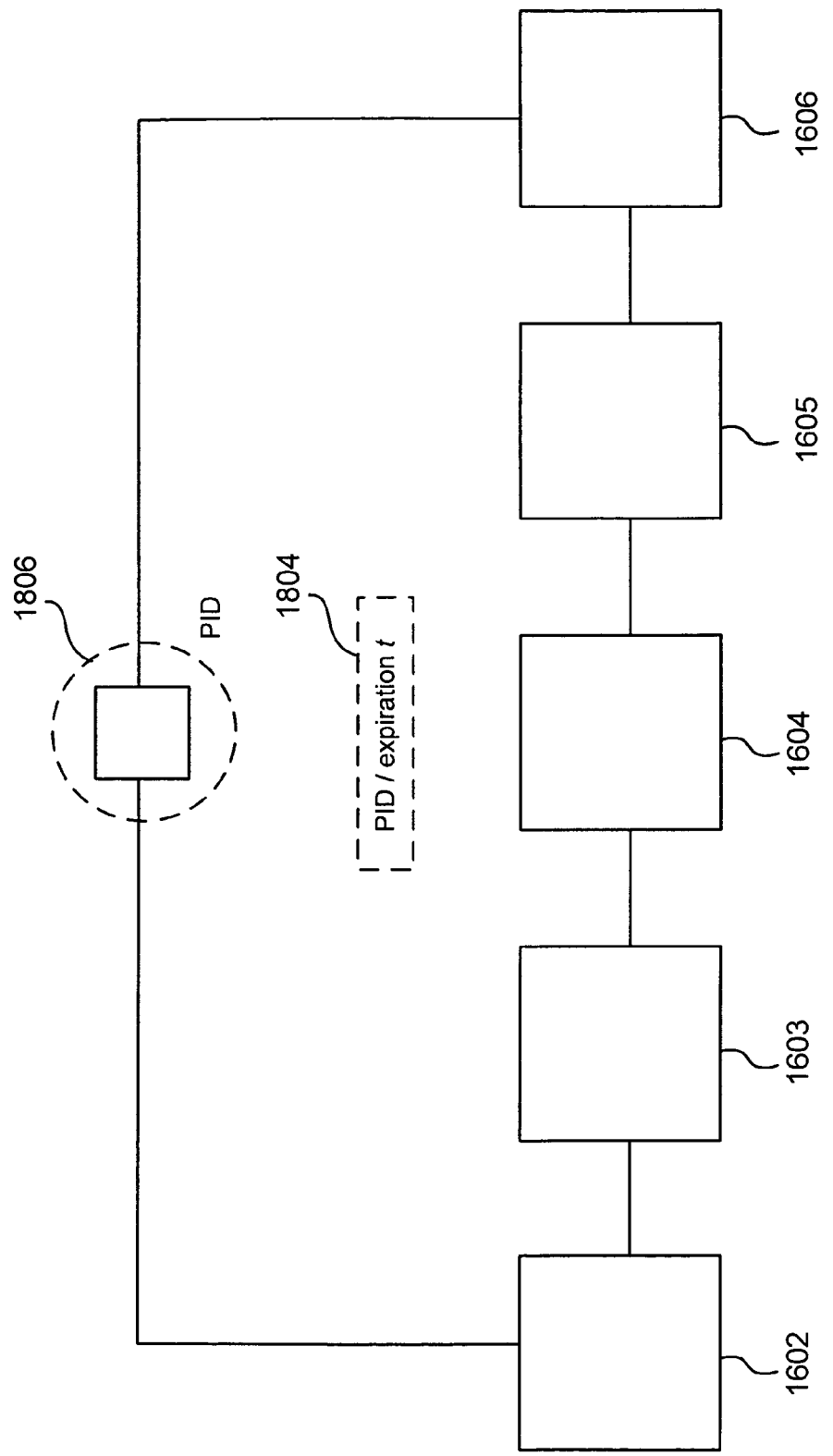
FIG. 18 shows a distributed-lock protocol based on a distributed storage register that represents one embodiment of the present invention.

Having a distributed storage register, implemented by the stored values, handler routines, and operational routines discussed above, a set of processes and/or processing entities can associate a distributed storage register with one or more resources for which access should be serialized, to allow concurrent sharing of the one or more recent sources by the processes and/or processing entities that collectively implement the associated distributed storage register. FIG. 18 shows a distributed-lock protocol based on a distributed storage register that represents one embodiment of the present invention. As shown in FIG. 18, the distributed storage register 1804 holds the concatenated values of a PID for a process holding the distributed lock, and an expiration time for the lock. When the distributed storage register holds a PID/expiration-time value, then the resource or resources associated with the distributed storage register is considered to be locked 1806 by the process or processing entity with the PID. When no process or processing entity holds the lock, then the resource or resources associated with the distributed storage register is considered to be not locked. A special value "NONE" or "NO PROCESS" may be used to indicate that no process currently holds the distributed lock. The distributed lock thus allows any given process or processing entity to lease the resource or resources associated with the distributed storage register for a specified period of time.

It should be noted that a variety of different lock semantics may be associated with a distributed lock. The distributed lock may be a lock only with respect to certain types of operations, such as WRITE operations, directed to a resource, or may lock a resource to all operations directed to the resource by processes and/or processing entities that do not hold the lock. Additionally, the lock may allow up to a specified maximum number of processes to concurrently access the resource or resources associated with the lock. As discussed above, resources may be devices, data, memory regions, data structures, logical entities, including volumes, and any other device or computational resource for which multiple processes or processing entities may concurrently, simultaneously, or both concurrently and simultaneously contend.

Various different distributed-lock protocols may be implemented in order to create the distributed lock, based on a distributed storage register, illustrated in FIG. 18. Again, as with the distributed-storage-lock protocol, discussed above, processes and/or processing entities that cooperatively share a resource using the distributed lock are assumed to not behave maliciously, and to adhere faithfully to the distributed-lock protocol.

Figure 19:
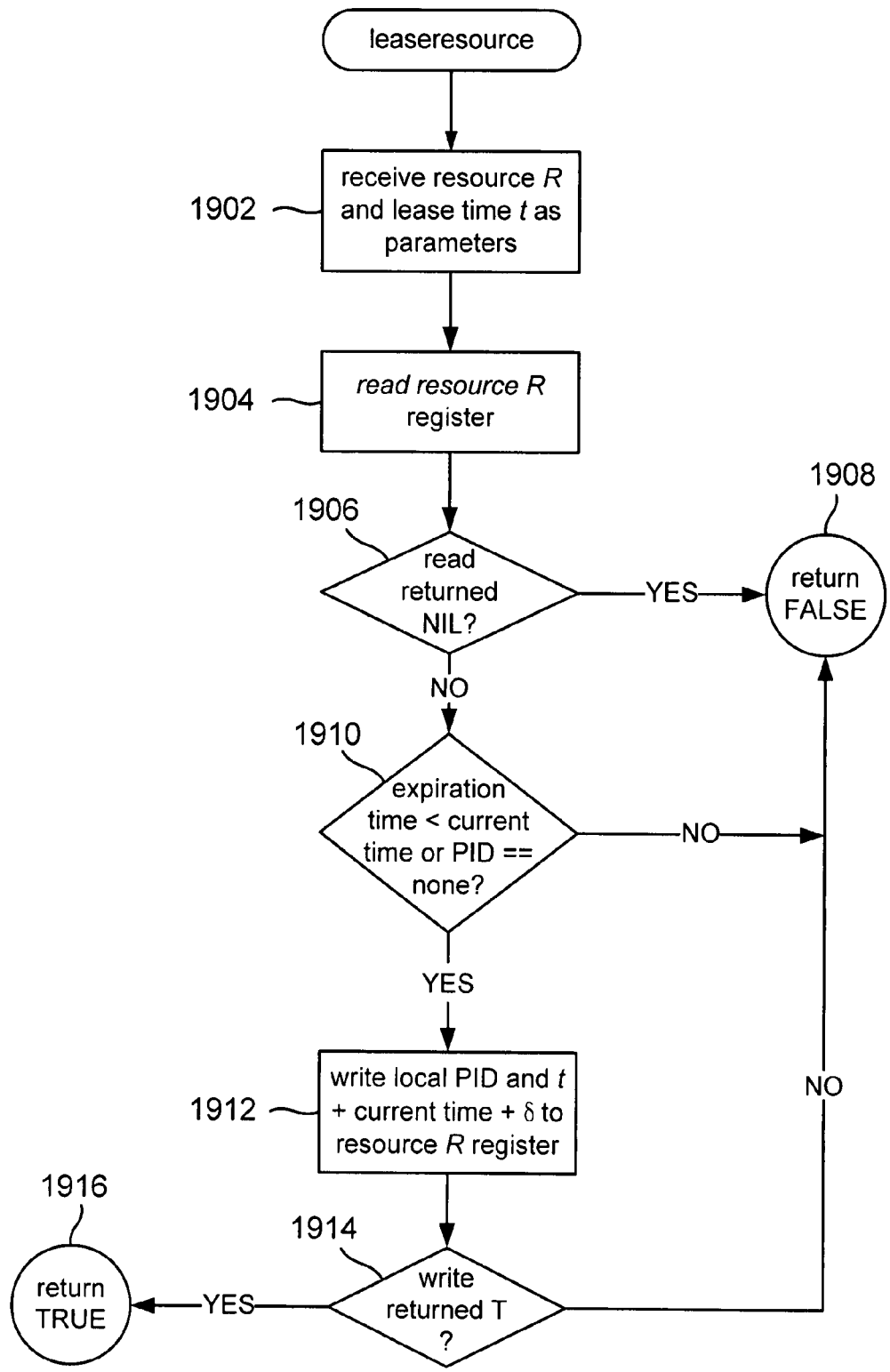
FIG. 19 shows a simple distributed-lock protocol implemented by a routine "leaseResource," used in various embodiments of the present invention.
Figure 20:
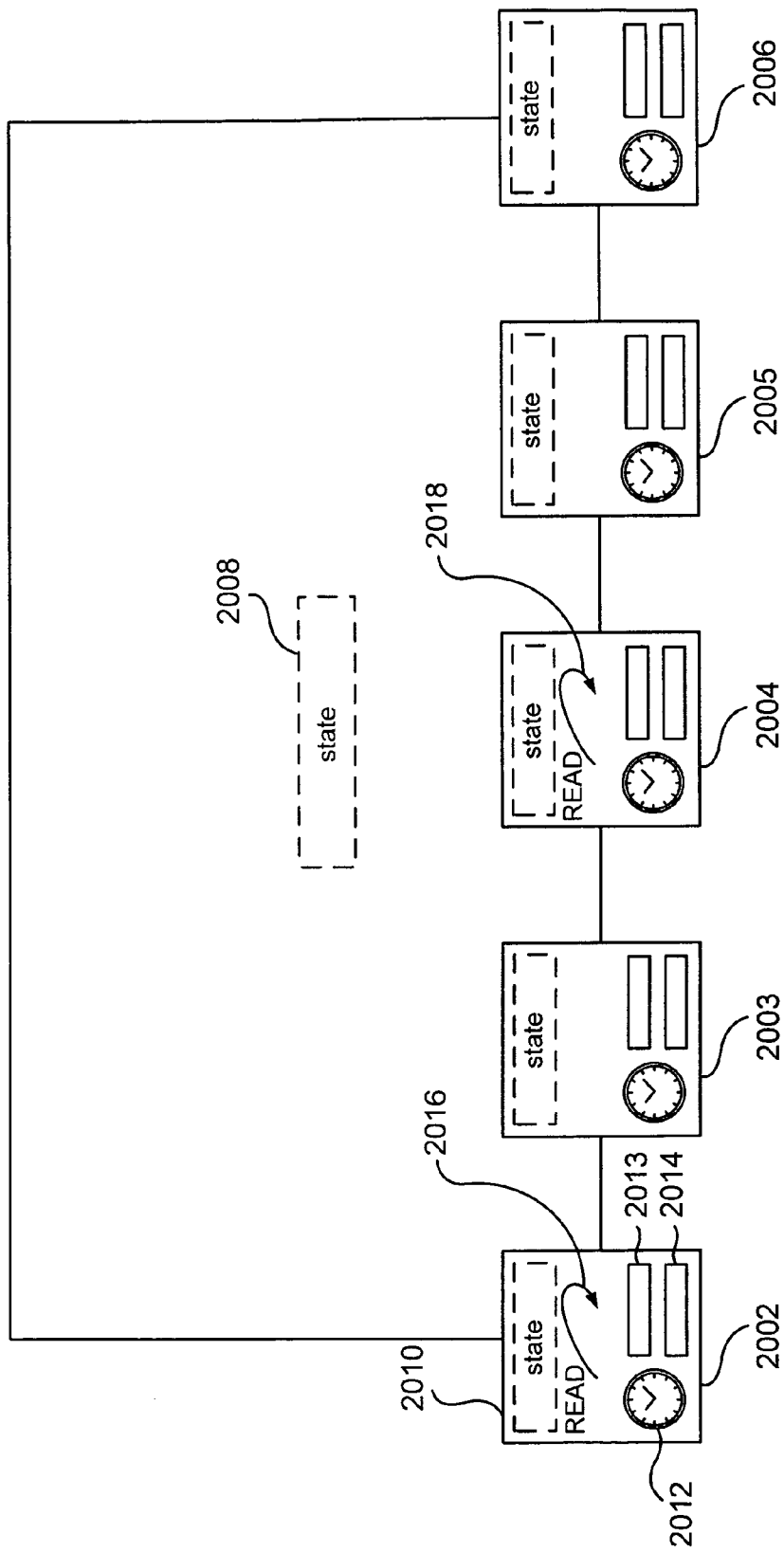
FIGS. 20-27 illustrate a distributed, but locally cached, storage register in the same fashion as the distributed storage register as illustrated in FIGS. 8-14, employed in various embodiments of the present invention.

FIG. 19 shows a simple distributed-lock protocol implemented by a routine "leaseResource." The routine "leaseResource" is called by a process or processing entity in order to lock a resource or set of resources associated with a distributed storage register for a specified period of time. In step 1902, the routine "leaseResource" receives an identifier R that identifies the particular resource or resources for which a lock is desired, and a lease time t for which the lock is desired. Note that a process or processing entity may concurrently access a number of different resources or sets of resource, each associated with a separate distributed lock, by locking the different resources through separate calls to "leaseResource." In step 1904, the routine "leaseResource" reads the contents of the distributed storage register associated with resource or resources R using the above-described distributed-storage-register protocol. If the READ operation in step 1904 returns the value NIL, as determined in step 1906, then the routine "leaseResource" returns the value "FALSE" in step 1908. Otherwise, if the expiration time read from the distributed storage register is less than the current time obtained from the local system clock, or the PID read from the distributed storage register has the value "NONE" or "NO PROCESS" as determined in step 1910, then, in step 1912, the routine "leaseResource" writes the local PID of the process or processing entity calling the routine "leaseResource" and a time value equal to t+current_system_time+$\delta$ to the distributed storage register associated with resource or resources R. If the WRITE operation, carried on in step 1912, returns the Boolean value "TRUE," as determined in step 1914, then the routine "leaseResource" returns a value "TRUE" in step 1916. Otherwise, the routine "leaseResource" returns the Boolean value "FALSE", in step 1908. Note that, in step 1910, the comparison of the expiration time with the current time is sufficient to guarantee that the lease has expired, because the value $\delta$ added to the expiration-time computation, in step 1912, pads the expiration time to account for the lack of precise synchronization between system clocks of the various processes and processing entities. Note also that a process or processing entity should not attempt to access the resource or set of resources following expiration of a lease, without again calling the routine "leaseResource." The value $\delta$ may depend on communications media and systems, and may be in the range of milliseconds, seconds, minutes, tens of minutes, or longer time intervals. A process can guarantee that it adheres to the distributed-lock protocol by, among other methods, setting a timer upon taking out a lease, and checking for timer expiration prior to accessing the leased resource or set of resources. Note also that, when many processes or processing entities contend for the resource or set of resources over a period of time, access to the resource or resources is not guaranteed within a particular time interval to any individual process or processing entity by the implementation of the routine "leaseResource" shown in FIG. 19.

A final method and protocol manages shared, cached, state information. It turns out that management of shared, cached, state information can be effectively carried out in a distributed computing environment using a method and a protocol representing an enhancement of the method and protocol for distributed storage registers, discussed above. An additional enhancement provides an atomic read-and-modify operation for shared, but locally cached, state information.

FIGS. 20-27 illustrate a distributed, but locally cached, storage register in the same fashion as the distributed storage register is illustrated in FIGS. 8-14. These illustrations show five nodes, or component data-storage systems 2002-2006, that together share and maintain a distributed, but locally cached, storage register 2008. Each node maintains a local copy, or local cache, corresponding to the distributed, but locally cached, storage register, such as local copy 2010 in node 2002. Each node has its own local clock, such as local clock 2012 in node 2002, (or system clock 1506 in FIG. 15), reflective of some absolute time standard, but not necessarily precisely synchronized with the clocks in the other nodes. Each node also includes two locally stored variables associated with the distributed, but locally cached, register 2008: (1) a current lease time-out value, such as a current lease time-out value 2013 in node 2002; and (2) a processing delay value, such as processing delay value 2014 in node 2002. The current lease time-out value 2013 indicates a time at which a current lease for the distributed, but locally cached, storage register expires for a given node. While the current lease is valid, or, in other words, not expired, and the node is not currently under a processing delay due to a failed modify of the local copy of the distributed, but locally cached, storage register, the node can freely read the contents of the distributed, but locally cached, storage register by accessing the locally stored copy, such as local copy 2010 in node 2002, as indicated by the curved arrows 2016 and 2018 in FIG. 20. Accessing a locally stored copy eliminates the communications overhead incurred in accessing a distributed storage register via the quorum-based distributed-storage-register protocol.

Figure 21:
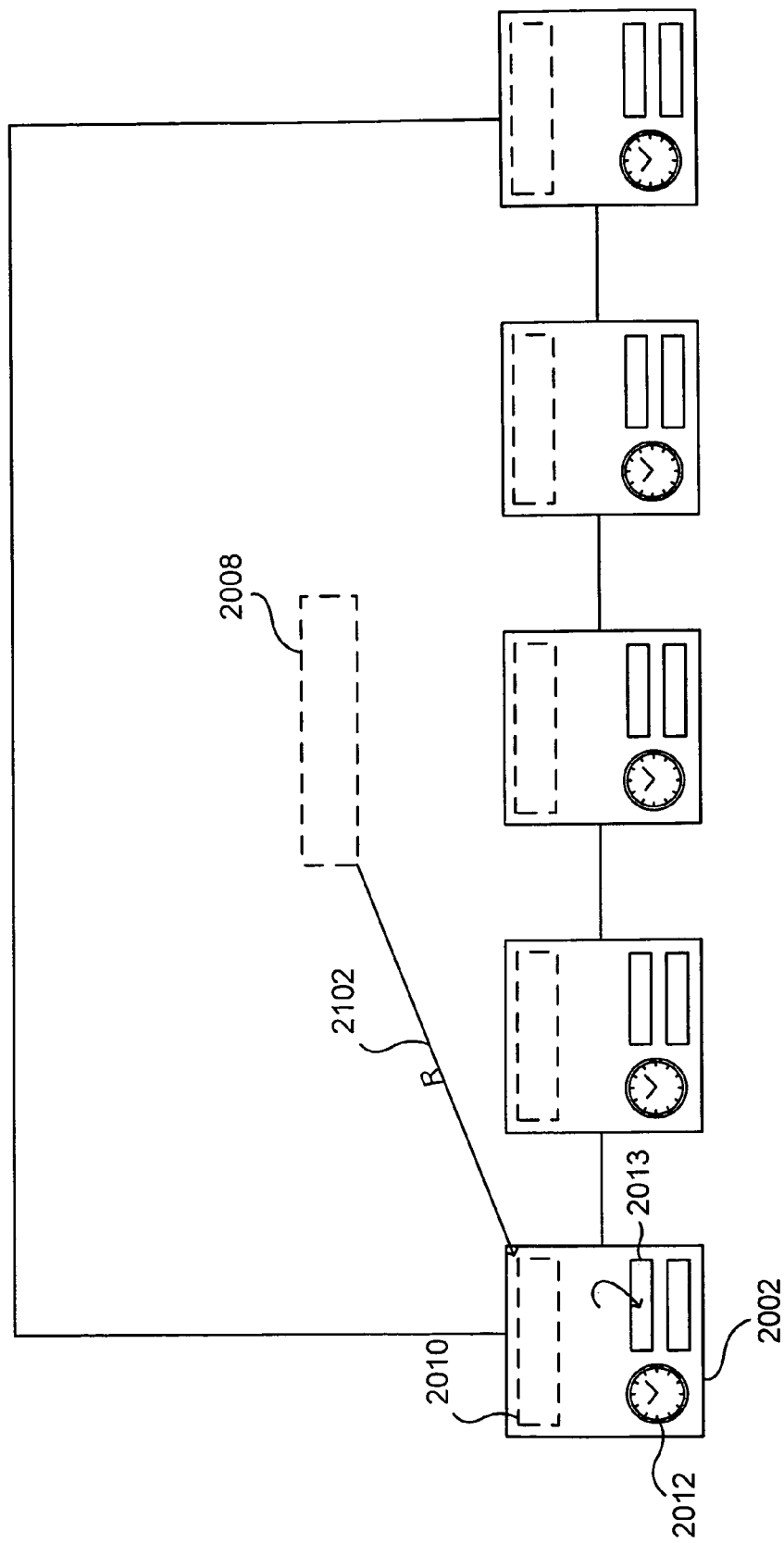

As shown in FIG. 21, when the current lease time-out value 2013 is less than or equal to the system time 2012 at a particular node 2002, the local lease for the distributed, but locally cached, storage register has expired, and the node refreshes its local copy 2010 of the distributed, but locally cached, storage register 2008 using the distributed-storage-register "read" operation 2102. When the local copy has been refreshed, the current lease time-out value 2013 is updated to provide a next lease for the node 2002, during the time of validity of which the node may freely access the local copy of the distributed, but locally cached, storage register to read the contents of the distributed, but locally cached, storage register.

Figure 22:
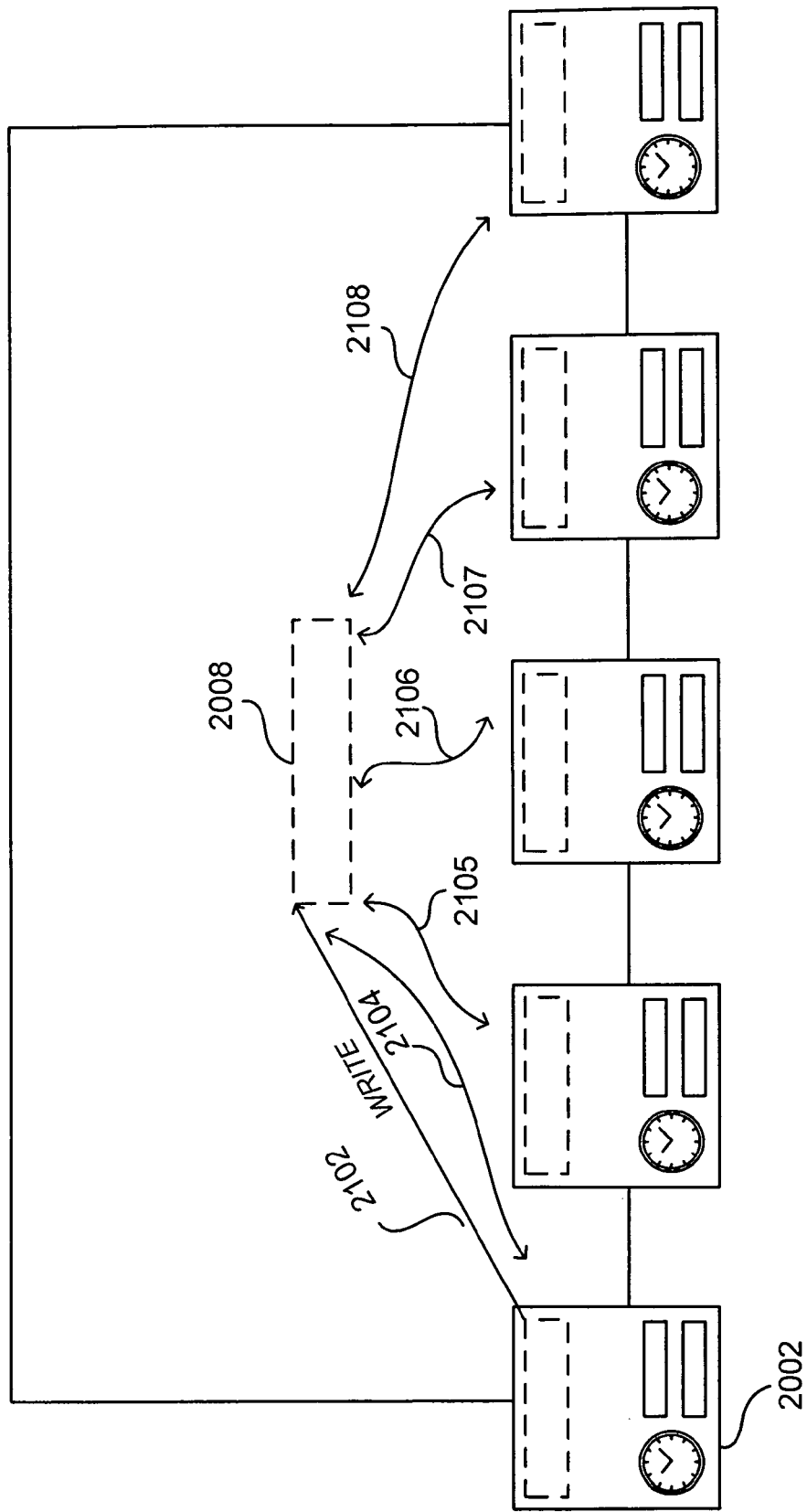
Figure 23:
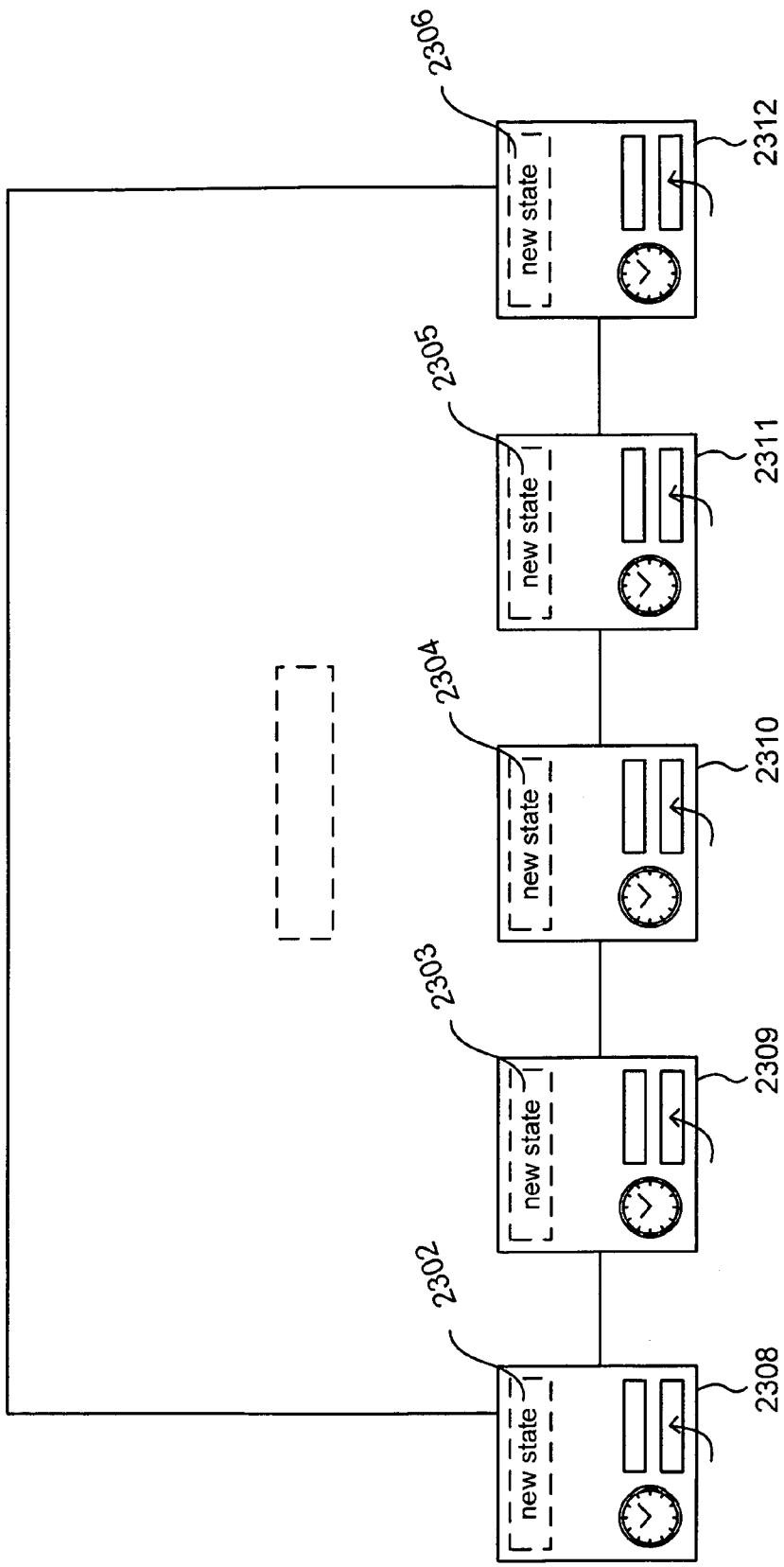
Figure 24:
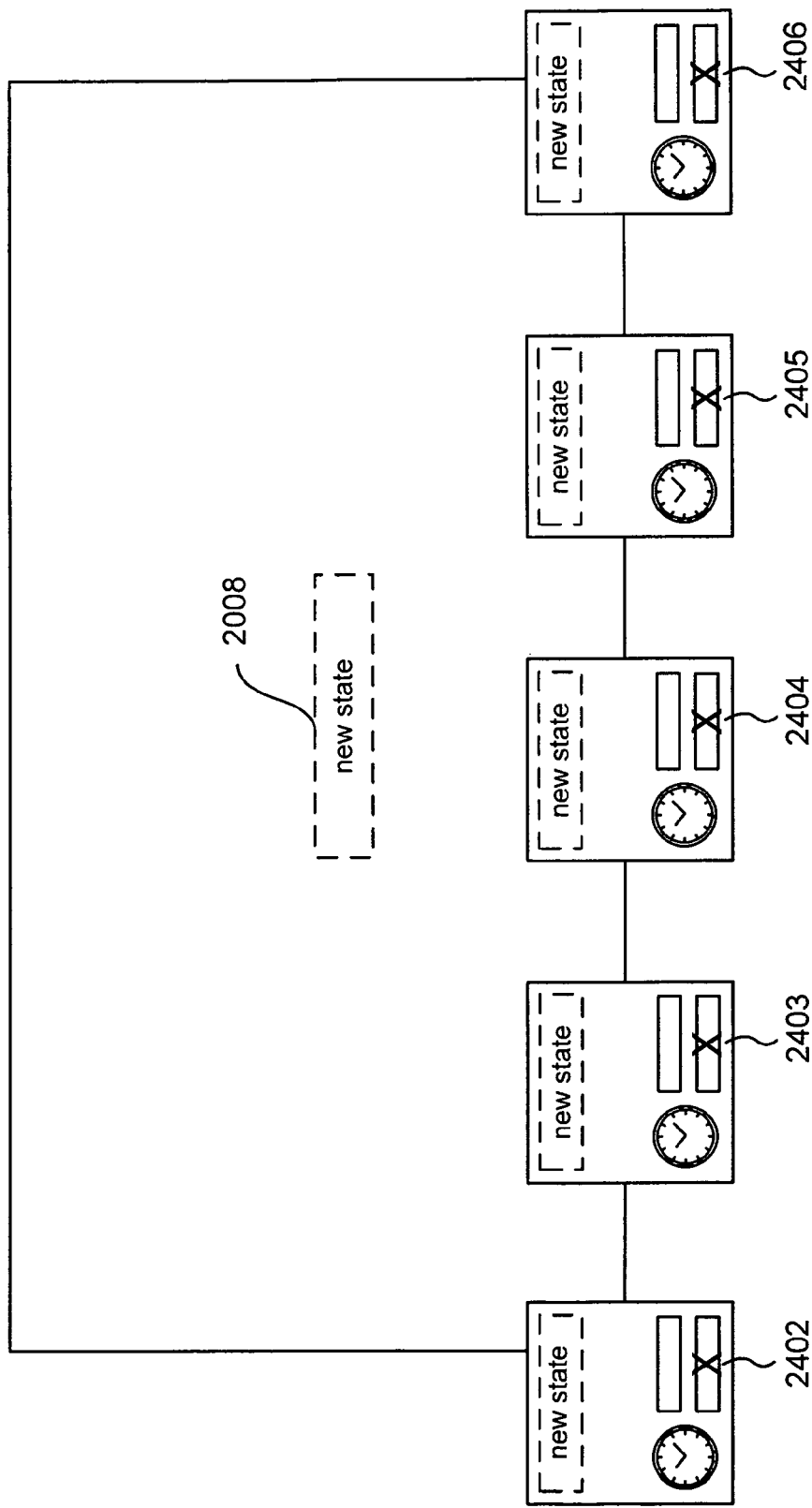
Figure 25:
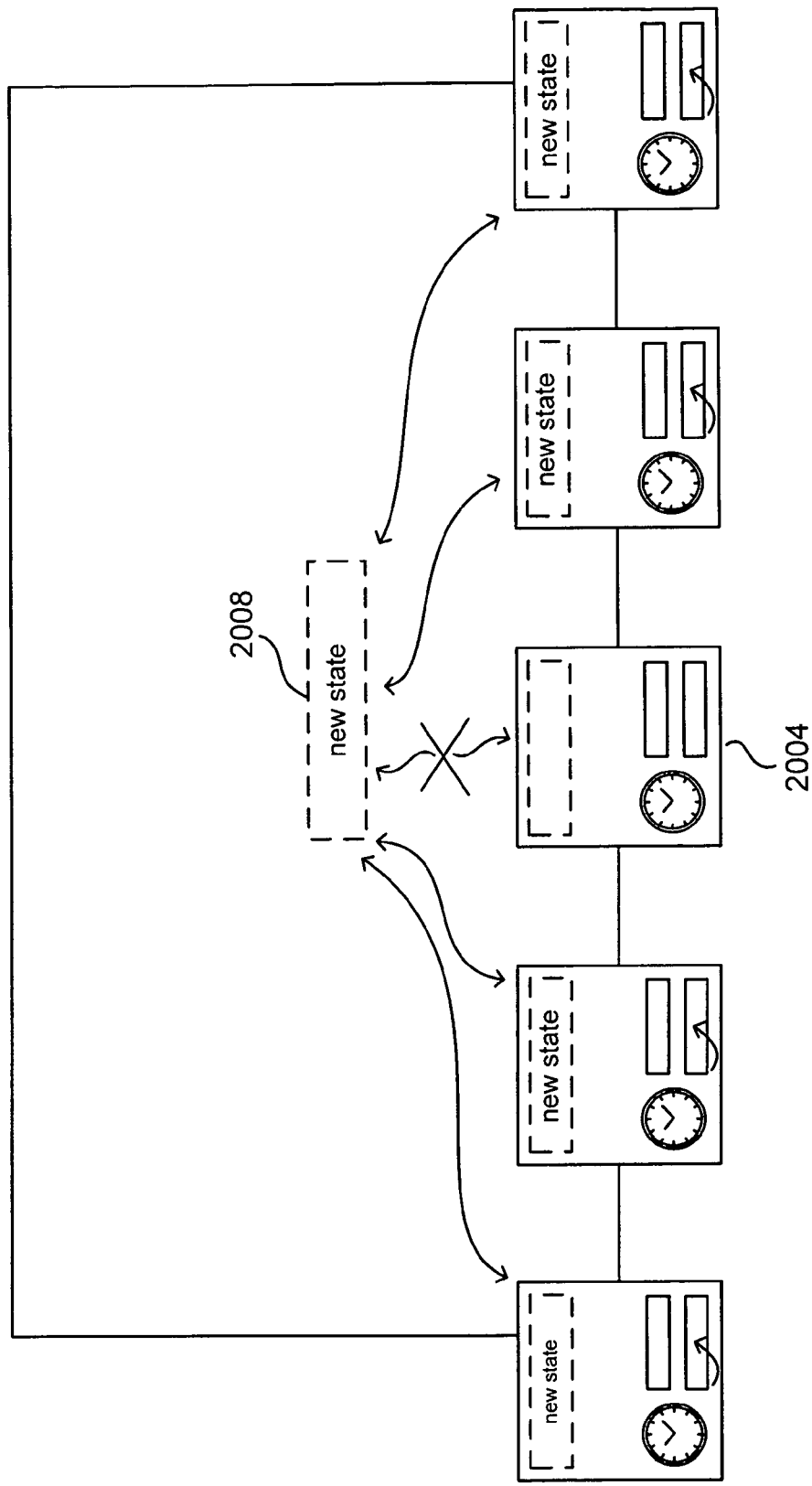
Figure 26:
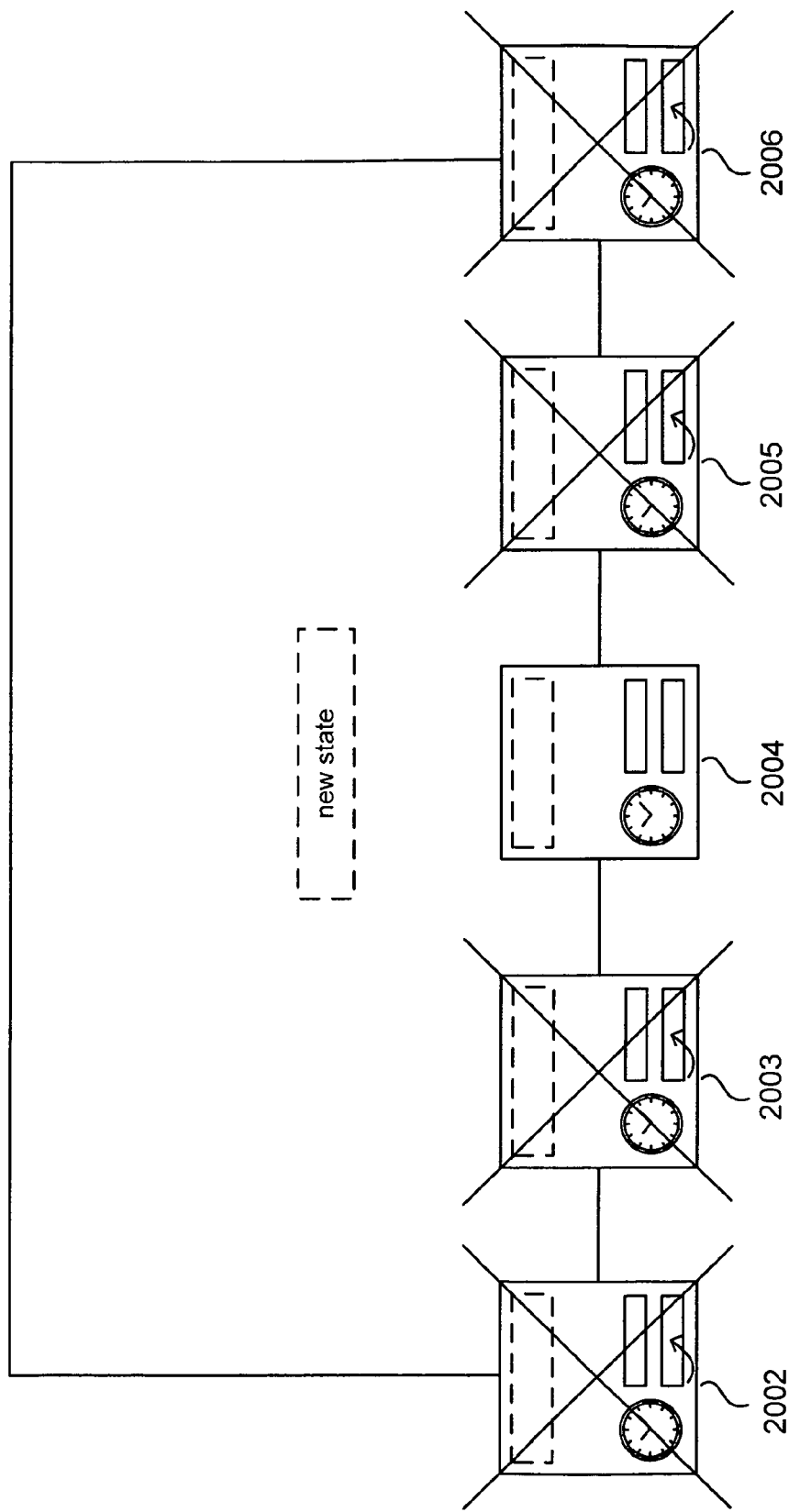
Figure 27:
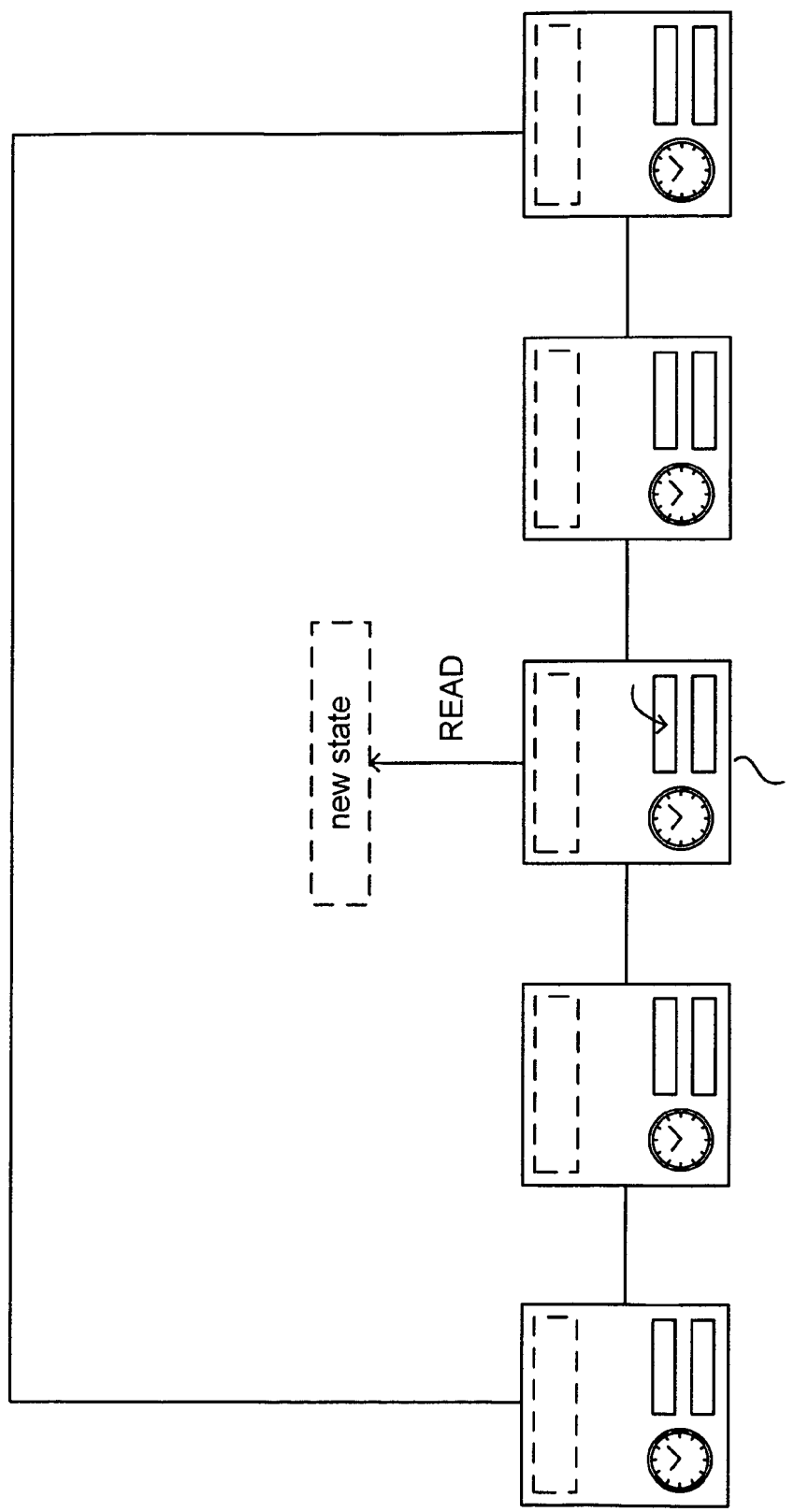

Modifying, or writing, the contents of a distributed, but locally cached, storage register is a somewhat more complex operation than writing a value to a distributed storage register. As shown in FIG. 22, a particular node, such as node 2002, may issue a WRITE operation 2102 to a distributed, but locally cached, storage register, resulting in a STATE WRITE message being sent 2104-2108 to all of the nodes that together implement the distributed, but locally cached, storage register. Upon receiving the STATE WRITE message, as shown in FIG. 23, each node updates its local copy of the distributed, but locally cached, storage register with a new state value 2302-2306, and initializes its processing delay value to a predetermined time value 2308-2312. If all nodes successfully update their local copies of the distributed, but locally cached, storage register, as shown in FIG. 24, then the processing delay value is cancelled 2402-2406, and the distributed, but locally cached, storage register 2008 is considered to have been successfully modified, and therefore contains the new, modified value. However, as shown in FIG. 25, should even one node 2004 fail to receive the STATE WRITE message and update its local copy of the distributed, but locally cached, storage register 2008, then, as shown in FIG. 26, the remaining nodes which received the STATE WRITE message and which updated their local copies 2002-2003 and 2005-2006 discontinue processing until the current time exceeds the processing delay value stored in each node. This ensures that the newly modified value of the distributed, but locally cached, storage register will not be used until the lease for the distributed, but locally cached, storage register held by node 2004 expires, and node 2004 obtains the modified value of the distributed, locally cached, storage register through a distributed-storage-register read operation, as shown in FIG. 27. Once the remaining nodes have delayed processing until their system time exceeds their locally stored processing delay values, then they can resume processing and accessing the distributed, but locally cached, storage register. Note that the write process is resilient to node crashes for the same reasons that the distributed-storage-register methods are resilient to node crashes, and that the caveats and assumptions discussed with respect to the distributed-storage-register methods apply as well to the distributed-but-locally-cached-storage-register methods.

Figure 28:
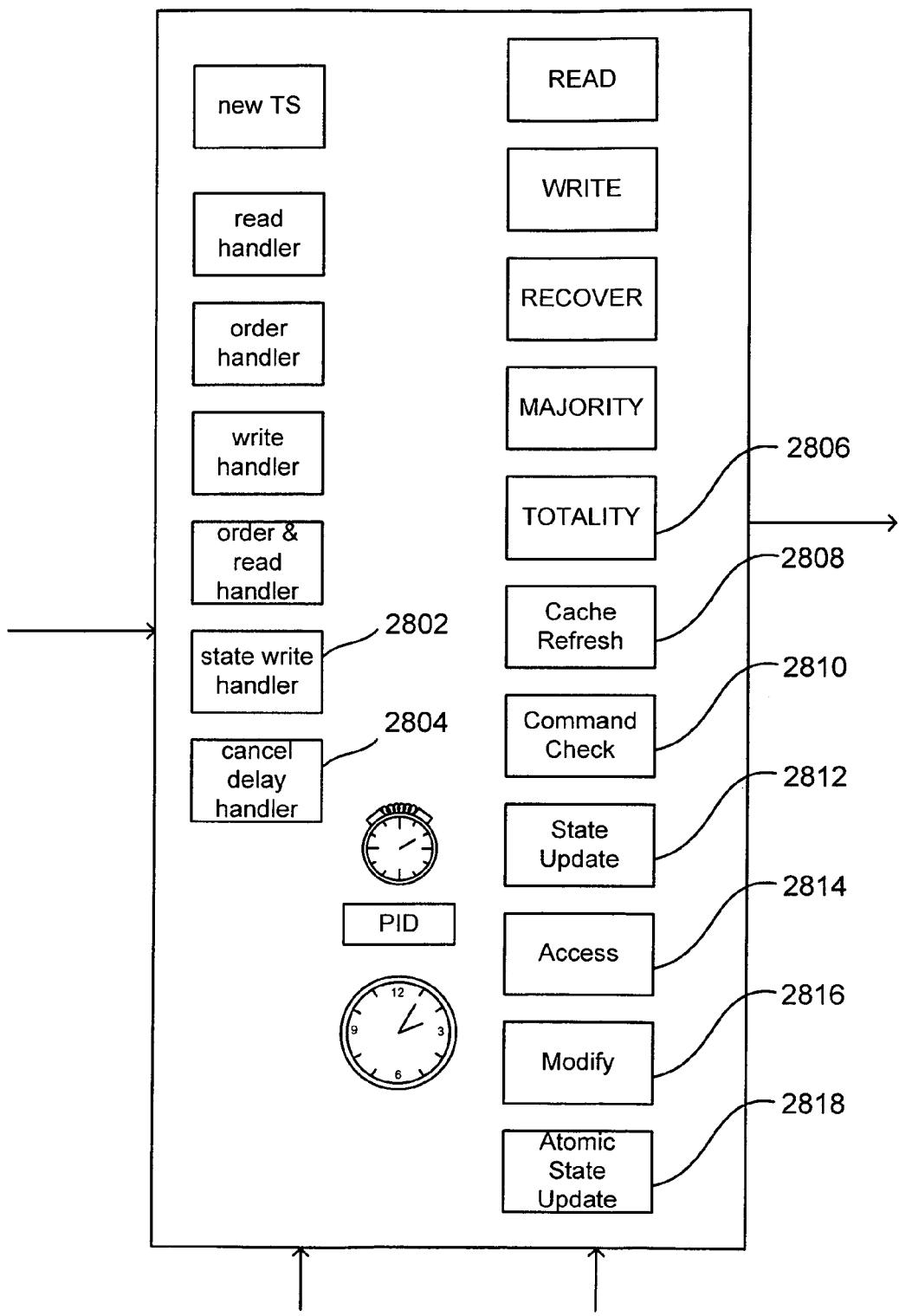
FIG. 28 shows the procedures and handlers used to implement a distributed, but locally cached, storage register used in various embodiments of the present invention, using the illustration conventions previously employed in FIG. 17.

Next, the procedures and handlers that are added to the distributed-storage-register procedures and handlers in order to implement a distributed, but locally cached, storage register are discussed. FIG. 28 shows the procedures and handlers used to implement a distributed, but locally cached, storage register, using the illustration conventions previously employed in FIG. 17. Two additional handlers used to implement a distributed, but locally cached, storage register include a STATE WRITE handler 2802 and a CANCEL DELAY handler 2804. Additional procedures used to implement a distributed, but locally cached, storage register include the procedures "totality" 2806, "CacheRefresh" 2808, "CoherentCacheRead" 2810, "StateUpdate" 2812, "access" 2814, modify 2816, and AtomicStateUpdate 2818. The final three procedures provide an atomic read-and-modify operation for distributed, but locally cached, storage registers.

FIG. 29 shows pseudocode implementations of the procedures that may be added to the distributed-storage-register procedures and handlers in order to implement a distributed, but locally cached, storage register. FIG. 30 shows pseudocode implementations of the handlers that may be added to the distributed-storage-register procedures and handlers in order to implement a distributed, but locally cached, storage register. It should be noted that these procedures and handlers are implemented in the context of command processing by a distributed data-storage system in which, in the course of command execution, a distributed, but locally cached, storage register containing shared state information may be accessed and/or modified. For example, the processing delays described above that occur when one or more nodes fail to update during a distributed, but locally cached, storage register modification are essentially delays in command processing by component data-storage systems for commands that involve access and/or modification of the state information contained in the distributed, but locally cached, storage register. The intent of using distributed, but locally cached, storage registers is to ensure a consistent value for shared, cached, state information throughout the component data-storage devices of a distributed data-storage system. Shared, cached, state information that is maintained in a distributed data-storage system can be stored in a set of distributed, but locally cached, storage registers, one unit of shared state information per register. The size of a register may vary to accommodate different natural sizes of units of shared state information. The granularity of state information units can be determined by performance monitoring, or by analysis of expected exchange rates of units of state information within a particular distributed system. Larger units incur less overhead for protocol variables and other data maintained for a distributed storage register, but may result in increased communications overhead if different portions of the units are modified at different times. It should also be noted that, while the above pseudocode and illustrations are directed to implementation of a single distributed storage register, these pseudocode routines can be generalized by adding parameters identifying a particular distributed storage register, of unit of state information, to which operations are directed, and by maintaining arrays of variables indexed by the identifying parameters. Note that a distributed, but locally cached, storage register is associated with variables val-ts and ord-ts, just like a distribute storage register.

The procedure "totality" is equivalent to the above-described routine "majority," except that "totality" attempts to obtain replies from all, rather than a majority, of the nodes. The procedure "totality" is used to ensure that all of the local values maintained at nodes for a distributed, but locally cached, storage register are identical. Otherwise, nodes with a more recent modification refrain from processing commands related to the distributed, but locally cached, storage register until the local values maintained at nodes for a distributed, but locally cached, storage register are again all identical, or until their leases have expired.

The procedure "CacheRefresh" (2902 in FIG. 29) is called generally prior to expiration of a lease for a distributed, but locally cached, storage register, or, with less efficiency for distributed data-storage-system operation, following expiration of the lease. First, on line 2, a temporary lease time-out value, temp_lease_timeout, is initialized to the current system time plus some pre-determined lease time for the distributed, but locally cached, storage register. Next, on line 3, the contents of the distributed, but locally cached, storage register is read via a quorum-based distributed-storage-register "read." If "read" succeeds, the current lease time-out value is updated on lines 5 and 6, with message delay and skew allowance factored in to ensure that the lease expires prior to access to a modified value of the distributed, but locally cached, storage register by a node with an older local value during failures of the type discussed with reference to FIGS. 25 and 26.

The procedure "CoherentCacheRead" (2904 in FIG. 29) is representative of command processing procedures executed on a component data-storage system of a distributed data-storage system. On line 2, if the command is a type of command that requires immediate processing by the data-storage-device interface, regardless of the readiness of the component device for processing data-access commands, then the command is processed and a response returned. Otherwise, if the node is currently in a state of command-processing delay, due to a failed modification of a distributed, but locally cached, storage used to process the command, as determined on line 3, then processing of the command is delayed on line 4. In general, commands that involve the distributed, but locally cached, storage register received during a command-processing delay continue to be queued for eventual execution. If, as determined on line 5, the lease has expired for a distributed, but locally cached, storage register that is accessed or modified during command processing, then a NOT READY, or failure, status should be returned by the component data-storage system, since the distributed, but locally cached, storage register cannot currently be accessed. Finally, on line 9, if there are no delays or failures with respect to distributed, but locally cached, storage registers used for processing of the received command, the command is processed using both local and shared state information, as necessary.

The procedure "StateUpdate" (2906 in FIG. 29) is used to modify the contents of a distributed, but locally cached, storage register. First, on line 2, a new time stamp is acquired, and placed in variable ts. Next, on line 3, the procedure "majority" is called to send an ORDER message to all of the nodes. If any reply to the ORDER message is false, or "majority" fails, as determined on line 4, then the update fails. Otherwise, on line 6, the procedure "totality" is called to send a STATE WRITE message to all of the nodes. If any node responds with a failure message, or a majority of nodes fail to reply, then the update fails, as determined on line 7. If all of the nodes reply, with no failures, then, on line 9, CANCEL DELAY messages are sent to all of the nodes to allow them to continue processing commands using the updated distributed, but locally cached, storage register, the procedure "any" issuing the CANCEL DELAY messages, but not waiting for responses. Otherwise, CANCEL DELAY messages are not sent, so that those nodes that successfully modified the distributed, but locally cached, storage register delay accessing the distributed, but locally cached, storage register until the leases of nodes that failed to update their local values expire, or until a successful modification of the local values of all nodes is achieved.

The procedure "access" (2908 in FIG. 29) is used as the first part of an optimistic atomic read-and-modify operation on a distributed, but locally cached, storage register. The optimistic read-and-modify operation is a weaker lock than the distributed locking protocol described above with reference to FIGS. 18 and 19, suitable for idempotent operations that can fail, following acquisition of an access right, but before the acquired access right is exercised, and that can subsequently be repeated without deleterious consequences. The procedure "majority" is called, on line 2, to send an ORDER&READ message to all nodes. The status returned by the procedure "majority" and the local value of the locally cached, storage register stored in variable val from the node having the highest timestamp value val-ts is returned by the procedure "access." The procedure "modify" (2910 in FIG. 29) is used as the second part of an atomic read-and-modify operation on a distributed, but locally cached, storage register. The procedure "totality" is called, on line 2, to send a STATE WRITE message to all nodes. If any node returns a false reply, the procedure "modify" fails, as detected on line 3. Otherwise, a CANCEL DELAY message is sent to all nodes on line 5. The routine "any" sends the CANCEL DELAY message, without waiting for responses from the nodes to which the CANCEL DELAY message is sent. A received CANCEL DELAY message allows a node to resume processing commands earlier, but does not affect consistency or correctness. An atomic read-and-modify operation for a distributed, but locally cached, storage register, the procedure "AtomicState- Update" (2912 in FIG. 29), can be used to atomically read and update the contents of a distributed, but locally cached, storage register. On line 2, a new timestamp is generated. On line 3, the procedure "access" is called. If the status returned by the procedure "access" indicates failure, as determined on line 4, then AtomicStateUpdate fails. Otherwise, on line 5, a new value for the distributed, but locally cached storage register is obtained. Finally, on line 6, the procedure "modify" is used to update the contents of the distributed, but locally cached, storage register. The status returned by the procedure "modify" determines whether or not AtomicStateUpdate succeeds or fails, as reported on lines 7 and 8. An atomic read-and-modify operation may be used for implementation of command processing routines when the full strength of a distributed lock is not needed, and an optimistic lock can be instead used.

The STATE WRITE handler (3002 in FIG. 30) handles received StateWrite messages. First, on line 2, the time stamp received in the STATE WRITE message that invoked the STATE WRITE handler is compared to the local variables val-ts and ord-ts. If the received time stamp is valid, as determined on line 3, then the processing-delay value delay_timeout is set, the local copy for the distributed, but locally cached, storage register is updated, and the local variable val-ts is updated on lines 4-6. On line 7, any side effects of modification of the contents of the distributed, but locally cached, storage register are carried out. Finally, on line 8, a reply to the STATE WRITE message is sent to the node from which it was received.

In an alternative embodiment, delay_timeout may be set to an infinite or very long value, on line 4, and then reset to the value to which it is set on line 2 of the first embodiment following update of val_ts, on line 7. In this case, process failures would require that nodes in an infinite delay be detected, and the infinite delays cancelled. The alternative embodiment may be used in the case that successful update prior to processing delay expiration cannot be guaranteed.

The CANCEL DELAY handler (3004 in FIG. 30) handles received CANCEL DELAY messages. First, on line 2, the time stamp received in the cancel delay message is compared to the values of local variables "val-ts" and "ord-ts." If the received time stamp is valid, as determined on line 3, then the processing-delay value delay_timeout is cancelled and command processing for commands that depend on the distributed, but locally cached, storage register resumes.

Figure 31:
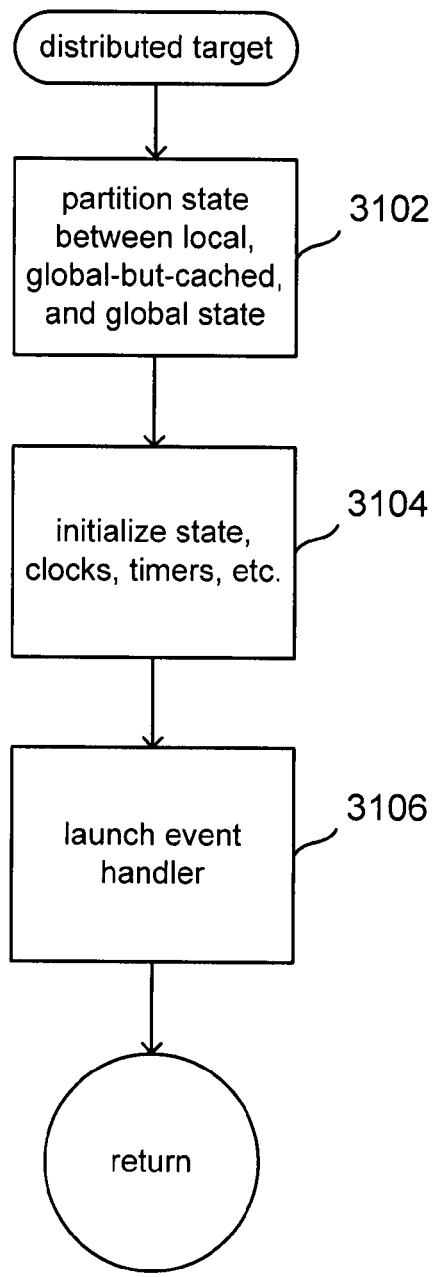
FIGS. 31 and 32 illustrate, using control-flow diagrams, an overall method that represents one embodiment of the present invention.
Figure 32:
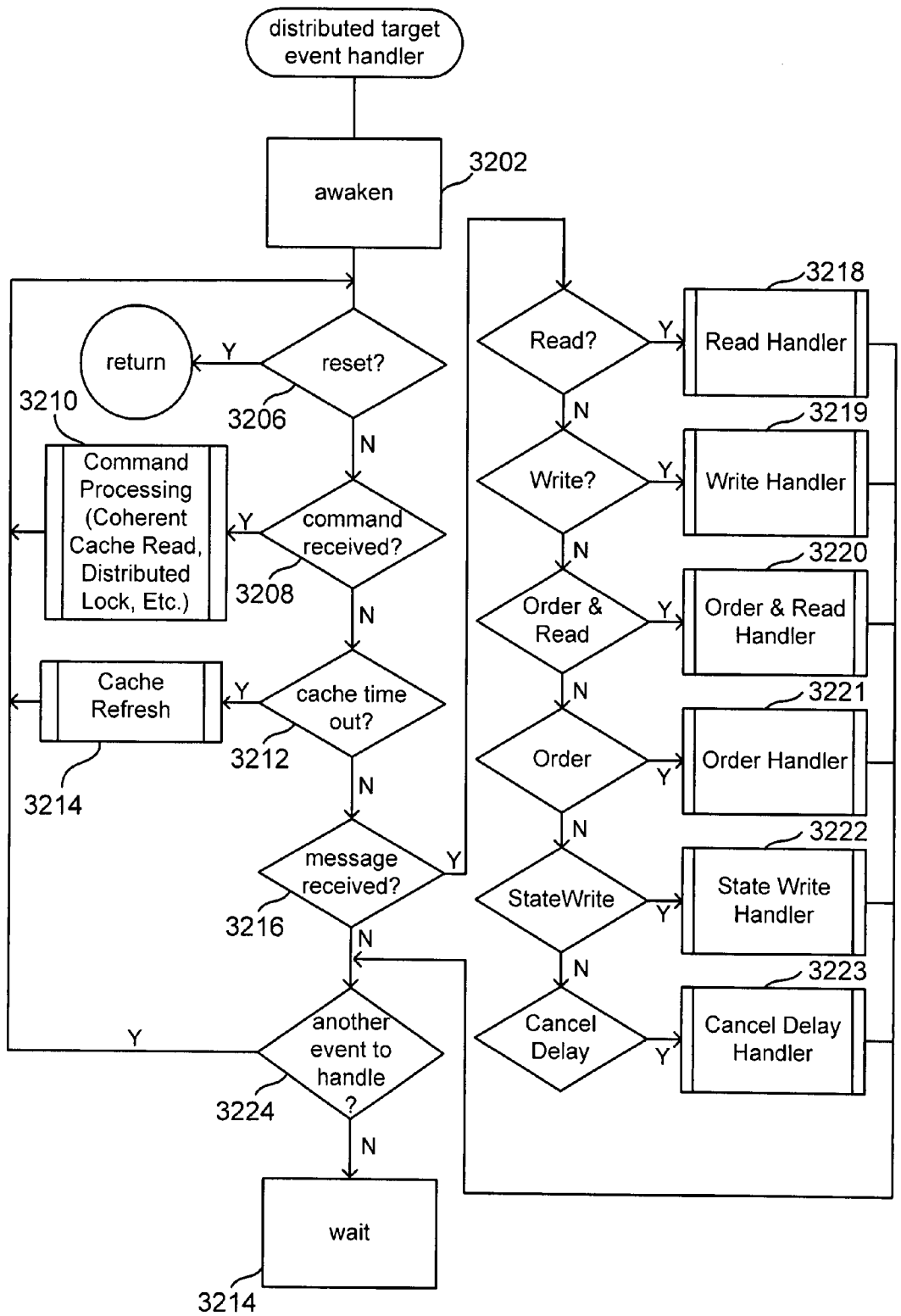

FIGS. 31 and 32 illustrate, using control-flow diagrams, an overall method that represents one embodiment of the present invention. FIG. 31 shows a method for launching operation of a component data-storage system of a distributed data-storage system. First, in step 3102, state information is partitioned between the three partitions: local state information; shared, cached, state information; and shared state information. Next, in step 3104, the various types of state information, system clocks, timers, and other components of the distributed-storage-register and distributed-but-locally-cached-storage-register protocols are initialized. Finally, in step 3106, an event handler is launched to receive and handle messages and commands.

FIG. 32 is a control-flow diagram of the event handler launched in step 3106 of FIG. 31. In step 3202, the event handler awakens to handle a detected event. Once the event handler has handled the event, and any other pending events, the event handler waits, in step 3204. The awaken and wait steps 3202 and 3204 can be implemented by continuous looping or by some type of process or thread suspension and signaling, depending on the implementation chosen for the data-storage-system control program. If the detected event is a reset command or other event that indicates a need to terminate the event handler, as determined in step 3206, then the event handler returns. Otherwise, if the event is associated with a received command, as determined in step 3208, then a command processing procedure for the command is called in step 3210. Alternatively, a single command-processing routine may internally branch to handle specific types of commands. Command processing may involve accessing state information of all types, including shared, cached state information accessed by calls to the routines "CoherentCacheRead" and "StateUpdate," may involve calls to the distributed storage register procedures discussed with reference to FIG. 17, and may involve calls to routines for distributed locking and optimistic distributed locking. Thus, step 3210 represents the point at which state information is accessed by READ and WRITE operations. Otherwise, if the event is a time out of a local cache, or local copy, as determined in step 3212, then the procedure "CacheRefresh" is called, in step 3214, normally before actual lease expiration, as mentioned above. If the event is associated with a received message, as determined in step 3216, then the appropriate handler for the message is called in one of steps 3218-3223. If there is another pending event to handle, as determined in step 3224, then control flows back to step 3206. Otherwise, control flows to the wait step 3204.

Although the present invention has been described in terms of particular embodiments, it is not intended that the invention be limited to this embodiment. Modifications within the spirit of the invention will be apparent to those skilled in the art. For example, many different alternative mappings of state information to sets of distribute storage registers and distributed, but locally cached, storage registers are possible. Many different settings of the various parameters used in the above-described routines and handlers may be suitable for different distributed data-storage systems, and at different points of time during operation of a particular data-storage system. Such parameters, and partitioning of state information, may be tuned by performance monitoring during distributed data-storage system operation.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for managing state information in a distributed computing system composed of component computing systems, the method comprising:
   for each component computing system,
      assigning each unit of state information to one of three partitions including
         a local state information partition,
         a distributed, shared, locally cached, but globally consistent state information partition, and
         a distributed, shared state information partition; and during operation of the distributed computing system,
  when units of state information are assigned to the local state information partition, independently managing, on each component computing system, local state information,
  when units of state information are assigned to the distributed, shared, locally cached, but globally consistent state information partition, managing each unit of distributed, shared, locally cached, but globally consistent state information among two or more component computing systems using a distributed-but-locally-cached-storage-register protocol, and
  when units of state information are assigned to the distributed, shared, state information partition, managing each unit of distributed, shared state information using a distributed-storage-register protocol, wherein the distributed-storage-register protocol provides quorum-based READ and WRITE operations directed to a distributed storage register comprising distributed-storage-register values locally stored on each component computing system, and wherein the distributed-but-locally-cached-storage-register protocol provides operations directed to a distributed, but locally cached, storage register including, in addition to the operations provided by the distributed-storage-register protocol, a local READ operation and a STATE WRITE operation.

2. The method of claim 1 wherein the local READ operation returns a locally stored value for the distributed, but locally cached, storage register, rather than a quorum-based value, provided that a local lease on the distributed, but locally cached, storage register is valid and processing is not delayed.

3. The method of claim 1 wherein the STATE WRITE operation succeeds when all component computing systems update their locally stored values for the distributed, but locally cached, storage register, but when one or a minority of the component computing systems fail to update their locally stored values for the distributed, but locally cached, storage register, the remaining component computing systems delay using their updated, locally stored values for the distributed, but locally cached, storage register until the leases of the one or a minority of the component computing system for the distributed, but locally cached, storage register can be expected to have expired.

4. The method of claim 1 wherein a locally stored value for the distributed, but locally cached, storage register on each component computing system is periodically refreshed by a quorum-based READ operation.

5. The method of claim 1 wherein the distributed-but-locally-cached-storage-register protocol provides an additional ATOMIC STATE UPDATE operation that allows a distributed, but locally cached, storage register to be read and then modified by a component computing system without intervening access by any other component computing system.

6. The method of claim 1 wherein a unit of distributed, shared, locally cached, but globally consistent state information or distributed, shared state information may comprise one of:
  a byte;
  a computer word;
  a field comprising a number of computer words;
  a record comprising a number of computer words;
  a data structure comprising a number of computer words; and
  an access control comprising one or more bytes that controls access to additional state information.

7. The method of claim 1 wherein the distributed computing system is a distributed data storage system comprising a number of component data-storage systems that together provide a consistent data-storage interface to one or more host computer systems.

8. Computer instructions encoded in a computer-readable medium, for, according to the method of claim 1:
  independently managing, on each component computing system, local state information;
  managing each unit of distributed, shared, locally cached, but globally consistent state information among two or more component computing systems using a distributed-but-locally-cached-storage-register protocol; and
  managing each unit of distributed, shared state information using a distributed-storage-register protocol.

9. A distributed data-storage system comprising:
  one or more communications media;
  a number of data-storage systems interconnected by the one or more communications media;
  a consistent, data-storage interface provided by the number of data-storage systems using distributed, shared, locally cached, but globally consistent state information and distributed, shared state information;
  a distributed-but-locally-cached-storage-register protocol for managing distributed, shared, locally cached, but globally consistent state information; and
  a distributed-storage-register protocol for managing distributed, shared state information, wherein each unit of distributed, shared, locally cached, but globally consistent state information is stored in a distributed, but locally cached, storage register and each unit of distributed, shared state information is stored in a distributed storage register, wherein the distributed-storage-register protocol provides quorum-based READ and WRITE operations directed to a distributed storage register comprising distributed-storage-register values locally stored on each component computing system, and wherein the distributed-but-locally-cached-storage-register protocol provides operations directed to a distributed, but locally cached, storage register including, in addition to the operations provided by the distributed-storage-register protocol, a local READ operation and a STATE WRITE operation.

10. The distributed data-storage system of claim 9 wherein the local READ operation returns a locally stored value for the distributed, but locally cached, storage register, rather than a quorum-based value, provided that a local lease on the distributed, but locally cached, storage register is valid and processing is not delayed.

11. The distributed data-storage system of claim 9 wherein the STATE WRITE operation succeeds when all component computing systems update their locally stored values for the distributed, but locally cached, storage register, but when one or a minority of the component computing systems fail to update their locally stored values for the distributed, but locally cached, storage register, the remaining component computing systems delay using their updated, locally stored values for the distributed, but locally cached, storage register until the leases of the one or a minority of the component computing system for the distributed, but locally cached, storage register can be expected to have expired.

12. The distributed data-storage system of claim 9 wherein a locally stored value for the distributed, but locally cached, storage register on each component computing system is periodically refreshed by a quorum-based READ operation.

13. The distributed data-storage system of claim 9 wherein the distributed-but-locally-cached-storage-register protocol provides an additional ATOMIC STATE UPDATE operation that allows a distributed, but locally cached, storage register to be read and then modified by a component computing system without intervening access by any other component computing system.

14. The distributed data-storage system of claim 9 wherein a unit of distributed, shared, locally cached, but globally consistent state information or distributed, shared state information may comprise one of:
 a byte;
 a computer word;
 a field comprising a number of computer words;
 a record comprising a number of computer words;
 a data structure comprising a number of computer words; and
 an access control comprising one or more bytes that controls access to additional state information.

15. The distributed data-storage system of claim 9 wherein the consistent, data-storage interface provided by the number of data-storage systems using distributed, shared, locally cached, but globally consistent state information and distributed, shared state information ensures that the effects of commands issues to the distributed data-storage system by host computers are serialized, so that a later executed command does not access stale state information subsequently modified by a earlier executed command.

* * * * *